United States Patent
Asami et al.

(10) Patent No.: US 9,909,512 B2
(45) Date of Patent: Mar. 6, 2018

(54) HYBRID VEHICLE AND CONTROL METHOD FOR HYBRID VEHICLE

(71) Applicant: TOYOTA JIDOSHA KABUSHIKI KAISHA, Toyoto-shi, Aichi-ken (JP)

(72) Inventors: Yoshikazu Asami, Gotenba (JP); Toshikazu Kato, Toyota (JP); Ryuta Teraya, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/119,240

(22) PCT Filed: Feb. 25, 2015

(86) PCT No.: PCT/IB2015/000223
§ 371 (c)(1),
(2) Date: Aug. 16, 2016

(87) PCT Pub. No.: WO2015/128721
PCT Pub. Date: Sep. 3, 2015

(65) Prior Publication Data
US 2017/0009667 A1    Jan. 12, 2017

(30) Foreign Application Priority Data
Feb. 25, 2014  (JP) ................. 2014-034260

(51) Int. Cl.
*B60L 9/00* (2006.01)
*F02D 13/02* (2006.01)
(Continued)

(52) U.S. Cl.
CPC ......... *F02D 13/0215* (2013.01); *B60W 10/06* (2013.01); *B60W 10/08* (2013.01);
(Continued)

(58) Field of Classification Search
CPC .... F02D 13/0215; F02D 13/023; F02D 13/02; F02D 37/02; F02D 41/024;
(Continued)

(56) References Cited

U.S. PATENT DOCUMENTS

2004/0118367 A1* 6/2004 Ezaki ................. F01L 1/042
123/90.11
2004/0237510 A1* 12/2004 Kusada ................. B60K 6/485
60/285

(Continued)

FOREIGN PATENT DOCUMENTS

| EP | 1 186 753 A2 | 3/2002 |
| JP | 9-242519 | 9/1997 |

(Continued)

*Primary Examiner* — Shardul Patel
(74) *Attorney, Agent, or Firm* — Finnegan, Henderson, Farabow, Garrett & Dunner, LLP

(57) ABSTRACT

A hybrid vehicle includes a controller that executes catalyst warm-up control for warming up a catalyst, including first control that operates an internal combustion engine at a first operating point, and second control, after executing the first control, that operates the engine at a second operating point irrespective of driving force required to propel the vehicle. Engine output at the second point is larger than engine output at the first point. Ignition timing of the engine at the time when the first control is executed is controlled to a retarded side with respect to an ignition timing of the engine at the time when the second control is executed. When the second control is executed, at least one of a valve lift of an intake valve and a valve operating angle of the intake valve increases as charging of an electrical storage device is more limited.

10 Claims, 23 Drawing Sheets

(51) Int. Cl.

| | |
|---|---|
| *B60W 10/06* | (2006.01) |
| *B60W 10/08* | (2006.01) |
| *B60W 10/26* | (2006.01) |
| *F02D 41/02* | (2006.01) |
| *F02P 5/15* | (2006.01) |
| *F01L 13/00* | (2006.01) |
| *B60W 20/16* | (2016.01) |
| *F02D 37/02* | (2006.01) |
| *F02D 41/00* | (2006.01) |
| *F01L 1/24* | (2006.01) |
| *F01L 1/26* | (2006.01) |
| *F01L 1/053* | (2006.01) |

(52) U.S. Cl.
CPC ............ *B60W 10/26* (2013.01); *B60W 20/16* (2016.01); *F01L 13/0063* (2013.01); *F02D 13/023* (2013.01); *F02D 13/0269* (2013.01); *F02D 37/02* (2013.01); *F02D 41/024* (2013.01); *F02D 41/0245* (2013.01); *F02P 5/1506* (2013.01); *B60W 2510/068* (2013.01); *B60W 2510/244* (2013.01); *B60W 2530/12* (2013.01); *B60W 2710/0616* (2013.01); *B60Y 2300/436* (2013.01); *B60Y 2300/437* (2013.01); *B60Y 2300/474* (2013.01); *F01L 1/2405* (2013.01); *F01L 1/267* (2013.01); *F01L 2001/0537* (2013.01); *F01L 2105/00* (2013.01); *F01L 2800/00* (2013.01); *F02D 2013/0292* (2013.01); *F02D 2041/001* (2013.01); *Y02T 10/142* (2013.01); *Y02T 10/26* (2013.01); *Y02T 10/46* (2013.01); *Y02T 10/54* (2013.01); *Y02T 10/6286* (2013.01); *Y10S 903/905* (2013.01)

(58) Field of Classification Search
CPC ... F02D 41/0245; B60W 20/16; B60W 10/16; B60W 10/08; B60W 10/26; B60W 2510/068; B60W 2530/12; F01L 13/0063; F02P 5/1506
USPC ...................................... 701/22; 60/272–324
See application file for complete search history.

(56) References Cited

U.S. PATENT DOCUMENTS

| | | | |
|---|---|---|---|
| 2012/0040915 A1* | 2/2012 | Mukhopadhyay | B82Y 5/00 514/19.4 |
| 2012/0132163 A1* | 5/2012 | Shoji | F01L 13/0026 123/90.16 |
| 2014/0007561 A1* | 1/2014 | Habu | F01N 9/00 60/277 |
| 2014/0118367 A1* | 5/2014 | Chen | G06F 1/3287 345/520 |

FOREIGN PATENT DOCUMENTS

| | | |
|---|---|---|
| JP | 2002-81330 | 3/2002 |
| JP | 2004-183610 | 7/2004 |
| JP | 2008-25550 | 2/2008 |
| JP | 2012-40915 | 3/2012 |
| JP | 2012-117376 | 6/2012 |
| JP | 2013-53610 | 3/2013 |
| JP | 2015-116959 | 6/2015 |
| JP | 2015-117656 | 6/2015 |
| WO | WO 2015/092509 A1 | 6/2015 |
| WO | WO 2015/092510 A2 | 6/2015 |

* cited by examiner

<VALVE OPERATING ANGLE/VALVE LIFT = LARGE>

<VALVE OPERATING ANGLE/VALVE LIFT = SMALL>

HYBRID VEHICLE AND CONTROL METHOD FOR HYBRID VEHICLE

CROSS-REFERENCE TO RELATED APPLICATIONS

This application is a national phase application of International Application No. PCT/IB2015/000223, filed Feb. 25, 2015, and claims the priority of Japanese Application No. 2014-034260, filed Feb. 25, 2014, the content of both of which is incorporated herein by reference.

BACKGROUND OF THE INVENTION

1. Field of the Invention

The invention relates to a hybrid vehicle and a control method for a hybrid vehicle and, more particularly, to a hybrid vehicle that includes an internal combustion engine including a variable valve actuating device for changing the operation characteristic of an intake valve, and a control method for the hybrid vehicle.

2. Description of Related Art

In order to purify exhaust gas from an internal combustion engine, an exhaust emission control device including a catalyst is used. To cause the catalyst to sufficiently exercise a purification function, it is required to increase the temperature of the catalyst.

For example, Japanese Patent Application Publication No. 2012-40915 (JP 2012-40915 A) describes a hybrid vehicle in which catalyst warm-up control is executed. In the catalyst warm-up control, a catalyst of an exhaust emission control device is warmed up. In this hybrid vehicle, when warm-up of the catalyst is required, initially, an internal combustion engine is operated at a first operating point at which the ignition timing of the internal combustion engine is retarded, the ignition timing is returned after the temperature of a catalyst end has increased, and then the internal combustion engine is operated at a second operating point at which an output required of the internal combustion engine is fixed. When warm-up of the catalyst has completed, the internal combustion engine is shifted into ordinary operation in which the output required of the internal combustion engine is changed on the basis of an output required of the vehicle as a whole (see JP 2012-40915 A).

There is also known an internal combustion engine including a variable valve actuating device that is able to change the operation characteristic of an intake valve. There is also known a variable valve actuating device that is able to change at least one of the valve lift and valve operating angle of an intake valve as such a variable valve actuating device (see Japanese Patent Application Publication No. 2004-183610 (JP 2004-183610 A), Japanese Patent Application Publication No. 2013-53610 (JP 2013-53610 A), Japanese Patent Application Publication No. 2008-25550 (JP 2008-25550 A), Japanese Patent Application Publication No. 2012-117376 (JP2012-117376 A), Japanese Patent Application Publication No. 9-242519 (JP 9-242519 A), and the like).

The hybrid vehicle described in JP 2012-40915 A includes a generator that generates electric power by using the power of the internal combustion engine and that exchanges electric power with a secondary battery. When the internal combustion engine operates, the secondary battery is charged by the generator. The hybrid vehicle further includes an electric motor that generates a vehicle driving force by using electric power stored in the secondary battery.

SUMMARY OF THE INVENTION

In such a hybrid vehicle, if charging or discharging of the secondary battery is limited during execution of the above control in which the internal combustion engine is operated at the second operating point in the catalyst warm-up control, it is not possible to continue the control, so there is a possibility that fuel economy and emissions in exhaust gas deteriorate. Specifically, when charging of the secondary battery is limited, the secondary battery is not able to absorb electric power that is generated by the generator as a result of operation of the internal combustion engine, so it is not possible to continue the operation at the second operating point. On the other hand, when discharging of the secondary battery is limited, traveling power is not ensured by the electric motor, so it is not possible to continue the operation at the second operating point in order to compensate for traveling power by using the output of the internal combustion engine.

In such a case, it is also conceivable to continue catalyst warm-up control by adjusting the output of the internal combustion engine with the use of a throttle valve. However, in the case where charging of the secondary battery is limited, when the throttle valve is controlled to a closing side in order to continue the catalyst warm-up control, fuel economy deteriorates because of an increase in pumping loss. In the case where discharging of the secondary battery is limited, when the throttle valve is controlled to an opening side in order to continue the catalyst warm-up control, emissions in exhaust gas deteriorate because of occurrence of load fluctuations.

The invention provides a hybrid vehicle and a control method for a hybrid vehicle, which are able to continue catalyst warm-up control without deterioration of fuel economy or emissions in exhaust gas even when charging or discharging of an electrical storage device is limited.

An aspect of the invention provides a hybrid vehicle. The hybrid vehicle includes an internal combustion engine, an electrical storage device, an electric motor, an exhaust emission control device, and a controller. The internal combustion engine includes a variable valve actuating device. The variable valve actuating device is configured to change an operation characteristic of an intake valve. The electrical storage device is configured to store electric power. The electric power is generated by using the internal combustion engine. The electric motor is configured to generate a driving force of the hybrid vehicle by using the electric power stored in the electrical storage device. The exhaust emission control device is configured to purify exhaust gas from the internal combustion engine with the use of a catalyst. The controller is configured to execute catalyst warm-up control. The catalyst warm-up control is control for warming up the catalyst of the exhaust emission control device. The catalyst warm-up control includes first control and second control. The first control is control for operating the internal combustion engine at a first operating point. The second control is control for, after the first control is executed, operating the internal combustion engine at a second operating point irrespective of a driving force that is required to propel the hybrid vehicle. An output of the internal combustion engine at the second operating point is larger than an output of the internal combustion engine at the first operating point. The controller is configured to operate the internal combustion engine such that an ignition timing of the internal combustion engine at the time when the first control is executed is controlled to a retarded side with respect to an ignition timing of the internal combustion engine at the time when the second control is executed. The controller is configured to control the variable valve actuating device such that, when the second control is executed, at least one of a valve lift of the intake valve and a valve operating angle of the intake valve increases as charging of the electrical storage device is more limited.

As at least one of the valve lift and the valve operating angle of the intake valve is increased, the output of the internal combustion engine decreases because of decompression. In this hybrid vehicle, during execution of the second control, the variable valve actuating device is controlled such that at least one of the valve lift and the valve operating angle of the intake valve is increased as charging of the electrical storage device is more limited. Therefore, it is possible to continue the second control even when charging of the electrical storage device is limited. The output of the internal combustion engine is adjusted by increasing at least one of the valve lift and valve operating angle of the intake valve, so it is not required to adjust a throttle valve. Thus, with this hybrid vehicle, even when charging of the electrical storage device is limited, it is possible to continue the catalyst warm-up control without deterioration of fuel economy or emissions in exhaust gas.

In the above aspect, the controller may be configured to control the variable valve actuating device such that, when the second control is executed, at least one of the valve lift and the valve operating angle at the time when at least one of a first condition or a second condition is satisfied is larger than the corresponding at least one of the valve lift and the valve operating angle at the time when both the first condition and the second condition are not satisfied. The first condition may be satisfied when a state of charge of the electrical storage device is higher than a first predetermined value. The second condition may be satisfied when the absolute value of a charge power upper limit value of the electrical storage device is smaller than a second predetermined value.

According to this aspect, even when charging of the electrical storage device is limited as a result of the fact that the state of charge of the electrical storage device becomes higher than the first predetermined value or the fact that the absolute value of the charge power upper limit value of the electrical storage device becomes smaller than the second predetermined value, it is possible to continue the catalyst warm-up control without deterioration of fuel economy or emissions in exhaust gas.

In the above aspect, the variable valve actuating device may be configured to selectively change the operation characteristic to any one of a first characteristic, a second characteristic and a third characteristic. At least one of the valve lift and the valve operating angle at the time when the operation characteristic is the second characteristic may be larger than the corresponding at least one of the valve lift and the valve operating angle at the time when the operation characteristic is the first characteristic. At least one of the valve lift and the valve operating angle at the time when the operation characteristic is the third characteristic may be larger than the corresponding at least one of the valve lift and the valve operating angle at the time when the operation characteristic is the second characteristic. The controller may be configured to control the variable valve actuating device such that, when the first control is executed, the operation characteristic is set to the first characteristic. The controller may be configured to control the variable valve actuating device such that, when the second control is executed and when at least one of a first condition or a second condition is satisfied, the operation characteristic is set to one of the second characteristic and the third characteristic.

In the above aspect, the variable valve actuating device may be configured to selectively change the operation characteristic to one of a first characteristic and a second characteristic. At least one of the valve lift and the valve operating angle at the time when the operation characteristic is the second characteristic may be larger than the corresponding at least one of the valve lift and the valve operating angle at the time when the operation characteristic is the first characteristic. The controller may be configured to control the variable valve actuating device such that, when the first control is executed, the operation characteristic is set to the first characteristic. The controller may be configured to control the variable valve actuating device such that, when the second control is executed and when at least one of a first condition and a second condition is satisfied, the operation characteristic is set to the second characteristic.

According to this aspect, when the first control is executed, the operation characteristic of the intake valve is set to the first characteristic. When the second control is executed and when at least one of the first condition and the second condition is satisfied, the operation characteristic is changed to the second characteristic or the third characteristic. Therefore, it is possible to continue the catalyst warm-up control without deterioration of fuel economy or emissions in exhaust gas.

In the above aspect, the controller may be configured to, when the second control is executed, determine a timing of an increase of at least one of the valve lift and the valve operating angle on the basis of an output of the internal combustion engine and a remaining execution time of the second control so that a state of charge of the electrical storage device does not exceed a predetermined upper limit value.

According to this aspect, it is possible to determine the timing of an increase of at least one of the valve lift and the valve operating angle on the basis of the remaining execution time of the second control. Therefore, it is possible to reliably execute the second control to the end.

In the above aspect, the controller may be configured to control the variable valve actuating device such that, when the second control is executed, at least one of the valve lift and the valve operating angle decreases as discharging of the electrical storage device is more limited.

As at least one of the valve lift and the valve operating angle of the intake valve is reduced, the compression ratio of air-fuel mixture increases. As the compression ratio of air-fuel mixture increases, the output of the internal combustion engine increases. In this aspect, during execution of the second control, the variable valve actuating device is controlled such that at least one of the valve lift and valve operating angle of the intake valve is reduced as discharging of the electrical storage device is more limited. Therefore, it is possible to continue the second control even when discharging of the electrical storage device is limited. The output of the internal combustion engine is adjusted by reducing at least one of the valve lift and valve operating angle of the intake valve, so it is not required to adjust a throttle valve. Thus, with this hybrid vehicle, even when discharging of the electrical storage device is limited, it is possible to continue the catalyst warm-up control without deterioration of fuel economy or emissions in exhaust gas.

In the above aspect, the controller may be configured to control the variable valve actuating device such that, when the second control is executed, at least one of the valve lift and the valve operating angle at the time when at least one of a third condition or a fourth condition is satisfied is smaller than the corresponding at least one of the valve lift and the valve operating angle at the time when both the third condition and the fourth condition are not satisfied. The third condition may be satisfied when a state of charge of the electrical storage device is lower than a third predetermined value. The fourth condition may be satisfied when the absolute value of a discharge power upper limit value of the electrical storage device is smaller than a fourth predetermined value.

According to this aspect, even when discharging of the electrical storage device is limited as a result of the fact that the state of charge of the electrical storage device becomes lower than the third predetermined value or the fact that the absolute value of the discharge power upper limit value of the electrical storage device becomes smaller than the fourth predetermined value, it is possible to continue the catalyst warm-up control without deterioration of fuel economy or emissions in exhaust gas.

In the above aspect, the variable valve actuating device may be configured to selectively change the operation characteristic to any one of a first characteristic, a second characteristic and a third characteristic. At least one of the valve lift and the valve operating angle at the time when the operation characteristic is the second characteristic may be larger than the corresponding at least one of the valve lift and the valve operating angle at the time when the operation characteristic is the first characteristic. At least one of the valve lift and the valve operating angle at the time when the operation characteristic is the third characteristic may be larger than the corresponding at least one of the valve lift and the valve operating angle at the time when the operation characteristic is the second characteristic. The controller may be configured to control the variable valve actuating device such that, when the second control is executed, when at least one of the third condition or the fourth condition is satisfied and when the operation characteristic is the second characteristic or the third characteristic, the operation characteristic is changed to the first characteristic.

In the above aspect, the variable valve actuating device may be configured to selectively change the operation characteristic to one of a first characteristic and a second characteristic. At least one of the valve lift and the valve operating angle at the time when the operation characteristic is the second characteristic may be larger than the corresponding at least one of the valve lift and the valve operating angle at the time when the operation characteristic is the first characteristic. The controller may be configured to control the variable valve actuating device such that, when the second control is executed, when at least one of the third condition and the fourth condition is satisfied and when the operation characteristic is the second characteristic, the operation characteristic is changed to the first characteristic.

According to this aspect, during execution of the second control, when the operation characteristic of the intake valve is the second characteristic or the third characteristic in the case where at least one of the third condition or the fourth condition is satisfied, the operation characteristic is changed to the first characteristic. Therefore, it is possible to continue the catalyst warm-up control without deterioration of fuel economy or emissions in exhaust gas.

Another aspect of the invention relates to a control method for a hybrid vehicle. The hybrid vehicle includes an internal combustion engine, an electrical storage device, an electric motor, an exhaust emission control device, and a controller. The internal combustion engine includes a variable valve actuating device. The variable valve actuating device is configured to change an operation characteristic of an intake valve. The electrical storage device is configured to store electric power. The electric power is generated by using the internal combustion engine. The electric motor is configured to generate a driving force of the hybrid vehicle by using the electric power stored in the electrical storage device. The exhaust emission control device is configured to purify exhaust gas from the internal combustion engine with the use of a catalyst. The control method includes executing catalyst warm-up control by the controller. The catalyst warm-up control is control for warming up the catalyst. The catalyst warm-up control includes first control and second control. The first control is control for operating the internal combustion engine at a first operating point. The second control is control for, after the first control is executed, operating the internal combustion engine at a second operating point irrespective of a driving force that is required to propel the hybrid vehicle. An output of the internal combustion engine at the second operating point is larger than an output of the internal combustion engine at the first operating point. The control method includes operating the internal combustion engine by the controller such that an ignition timing of the internal combustion engine at the time when the first control is executed is controlled to a retarded side with respect to an ignition timing of the internal combustion engine at the time when the second control is executed. The control method includes controlling the variable valve actuating device by the controller such that, when the second control is executed, at least one of a valve lift of the intake valve and a valve operating angle of the intake valve increases as charging of the electrical storage device is more limited.

According to the invention, it is possible to provide the hybrid vehicle that is able to continue the catalyst warm-up control without deterioration of fuel economy or emissions in exhaust gas even when charging or discharging of the electrical storage device is limited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
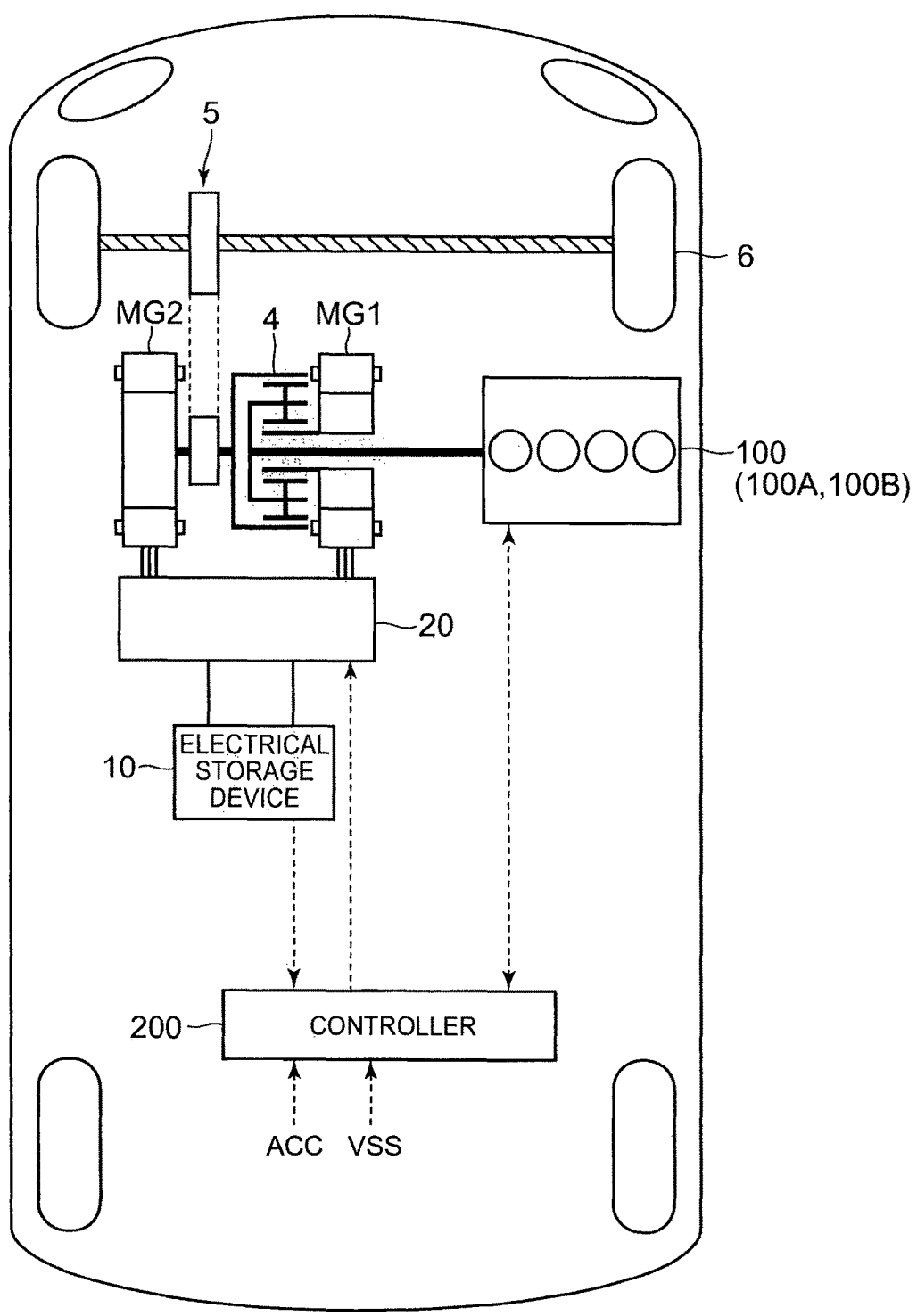
FIG. 1 is a block diagram that shows the overall configuration of a hybrid vehicle according to a first embodiment of the invention.

Hereinafter, embodiments of the invention will be described in detail with reference to the accompanying drawings. The plurality of embodiments will be described below; however, appropriate combinations of the configurations described in the embodiments are expected at the time of filing. Like reference numerals denote the same or corresponding portions in the drawings, and the description thereof will not be repeated.

FIG. 1 is a block diagram that shows the overall configuration of a hybrid vehicle according to the first embodiment of the invention. As shown in FIG. 1, the hybrid vehicle 1 includes an engine 100, motor generators MG1, MG2, a power split device 4, a reduction gear 5, and drive wheels 6. The hybrid vehicle 1 further includes an electrical storage device 10, a power control unit (PCU) 20 and a controller 200.

The hybrid vehicle 1 is able to travel by using driving force that is output from at least one of the engine 100 or the motor generator MG2. The engine 100 is, for example, an internal combustion engine, such as a gasoline engine and a diesel engine. The engine 100 generates driving force for propelling the vehicle. The engine 100 also generates driving force for driving the motor generator MG1 that is able to operate as a generator.

The engine 100 can be cranked by the motor generator MG1 to start up. The engine 100 includes a variable valve actuating device for changing the operation characteristic of each intake valve. The variable valve actuating device is controlled by the controller 200 on the basis of a traveling condition of the vehicle and startability of the engine 100. An exhaust emission control device is provided in an exhaust passage of the engine 100. The exhaust emission control device purifies exhaust gas from the engine 100 with the use of a catalyst. The configuration of the engine 100, variable valve actuating device and exhaust emission control device will be described in detail later.

The power split device 4 is configured to be able to split driving force, which is generated by the engine 100, into driving force for driving the drive wheels 6 via the reduction gear 5 and driving force for driving the motor generator MG1. The power split device 4 is formed of, for example, a planetary gear train.

Each of the motor generators MG1, MG2 is an alternating-current rotary electric machine, and is, for example, a three-phase alternating-current synchronous motor generator. The motor generator MG1 can generate electric power by using the driving force of the engine 100. The driving force of the engine 100 is received via the power split device 4. For example, when the SOC of the electrical storage device 10 reaches a predetermined lower limit, the engine 100 starts up, and electric power is generated by the motor generator MG1. Electric power generated by the motor generator MG1 is converted in voltage by the PCU 20. The converted electric power is temporarily stored in the electrical storage device 10, or the converted electric power is directly supplied to the motor generator MG2.

The motor generator MG2 generates driving force by using at least one of electric power stored in the electrical storage device 10 or electric power generated by the motor generator MG1. Driving force of the motor generator MG2 is transmitted to the drive wheels 6 via the reduction gear 5. In FIG. 1, the drive wheels 6 are front wheels. Instead of the front wheels or in addition to the front wheels, rear wheels may be driven by the motor generator MG2.

During braking of the vehicle, the motor generator MG2 is driven by the drive wheels 6 via the reduction gear 5, and the motor generator MG2 operates as a generator. Thus, the motor generator MG2 operates as a regenerative brake that converts braking energy to electric power. Electric power generated by the motor generator MG2 is stored in the electrical storage device 10.

The PCU 20 is a drive unit for driving the motor generators MG1, MG2. The PCU 20 includes an inverter for driving the motor generators MG1, MG2, and can further include a converter for converting voltage between the inverter and the electrical storage device 10.

The electrical storage device 10 is a rechargeable direct-current power supply, and includes, for example, a nickel-metal hydride secondary battery or a lithium ion secondary battery. The voltage of the electrical storage device 10 is, for example, about 200 V. The electrical storage device 10 stores electric power generated by the motor generators MG1, MG2. A large-capacitance capacitor may also be employed as the electrical storage device 10. The electrical storage device 10 may be any electric power buffer as long as the electric power buffer is able to temporarily store electric power generated by the motor generators MG1, MG2 and supply the stored electric power to the motor generator MG2. A sensor is provided at the electrical storage device 10. The sensor is used to detect the temperature Tb, current Ib and voltage Vb of the electrical storage device 10. Values detected by the sensor are output to the controller 200.

The controller 200 includes an electronic control unit (ECU) that includes a central processing unit (CPU), a storage device, input/output buffers, and the like (which are not shown). The controller 200 receives signals (an accelerator operation amount ACC, a vehicle speed VSS, and the like) from various sensors and outputs control signals to devices, and executes control over the devices in the hybrid vehicle 1. As major controls, the controller 200 executes traveling control over the hybrid vehicle 1, catalyst warm-up control for warming up the catalyst of the exhaust emission control device, control over the variable valve actuating device appropriate for the traveling control and the catalyst warm-up control, and the like. The operation of the controller 200 will be described later.

Figure 2:
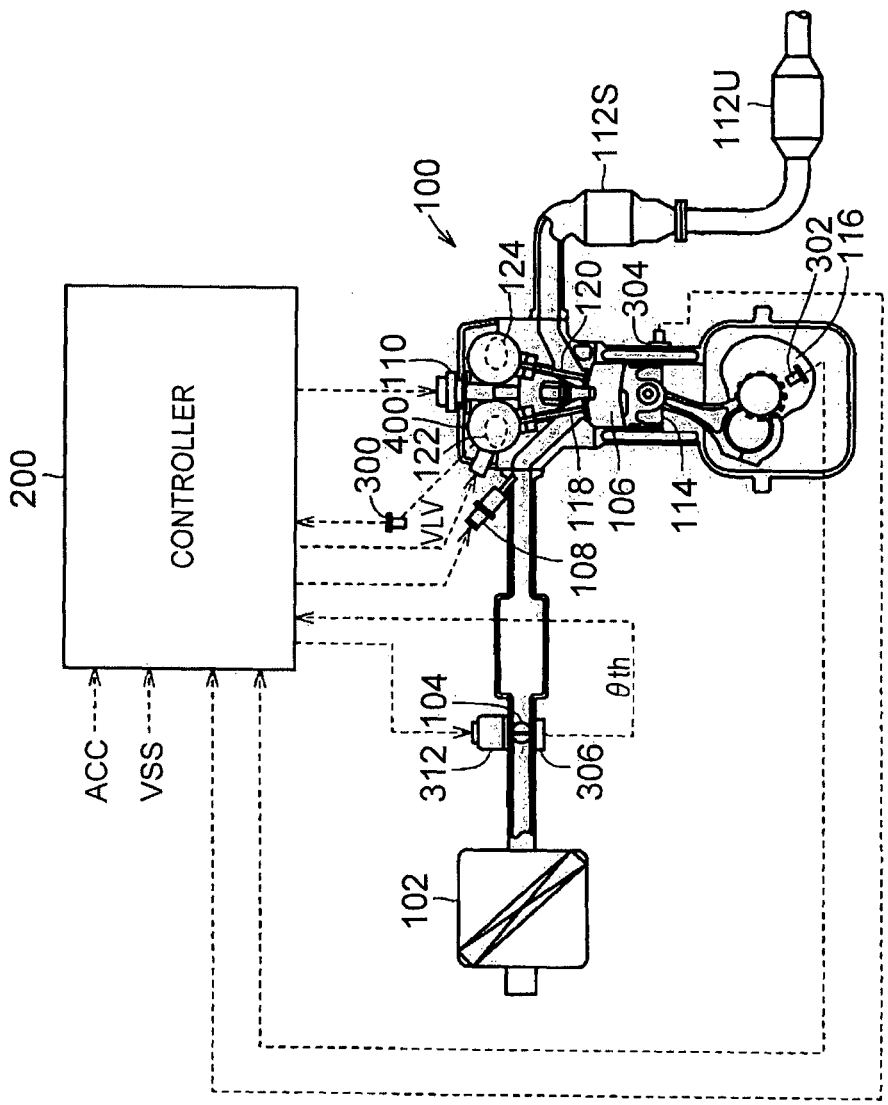
FIG. 2 is a configuration view of an engine shown in FIG. 1.

FIG. 2 is a configuration view of the engine 100 shown in FIG. 1. As shown in FIG. 2, air is taken into the engine 100 through an air cleaner 102. An intake air amount is adjusted by a throttle valve 104. The throttle valve 104 is driven by a throttle motor 312.

Intake air is mixed with fuel in each cylinder 106 (combustion chamber). Fuel is injected from each injector 108 to the corresponding cylinder 106. In this embodiment, the engine 100 will be described as a port injection type in which an injection hole of the injector 108 is provided in an intake port. In addition to the port injection injector 108, a direct injection injector that directly injects fuel into the corresponding cylinder 106 may be provided. Furthermore, only a direct injection injector may be provided.

Air-fuel mixture in each cylinder 106 is ignited by a corresponding ignition plug 110 to combust. The combusted air-fuel mixture, that is, exhaust gas, is emitted to the exhaust passage. The exhaust emission control device is provided in the exhaust passage. The exhaust emission control device purifies exhaust gas with the use of the catalyst. The exhaust emission control device includes a catalyst 112S (hereinafter, also referred to as "start catalyst (S/C catalyst)") and a catalyst 112U (hereinafter, also referred to as "under-floor (U/F) catalyst"). The catalyst 112U is arranged downstream of the S/C catalyst 112S. Exhaust gas is purified by the S/C catalyst 112S and the U/F catalyst 112U, and is then emitted to the outside of the vehicle. A piston 114 is pushed downward by combustion of air-fuel mixture, and a crankshaft 116 rotates.

The intake valve 118 and an exhaust valve 120 are provided at the top portion of each cylinder 106. The amount of air that is introduced into each cylinder 106 and the timing of introduction are controlled by the corresponding intake valve 118. The amount of exhaust gas that is emitted from each cylinder 106 and the timing of emission are controlled by the corresponding exhaust valve 120. Each intake valve 118 is driven by a cam 122. Each exhaust valve 120 is driven by a cam 124.

As will be described in detail later, the valve lift and valve operating angle of each intake valve 118 are controlled by a variable valve lift (VVL) device 400. The valve lift and valve operating angle of each exhaust valve 120 may also be controllable. A variable valve timing (VVT) device that controls the open/close timing of each valve may be combined with the VVL device 400.

The controller 200 controls a throttle opening degree θth, an ignition timing, a fuel injection timing, a fuel injection amount, and the operating state (open/close timing, valve lift, valve operating angle, and the like) of each intake valve so that the engine 100 is operated at a desired operating point in accordance with a traveling condition of the vehicle and a warm-up condition of the exhaust emission control device. The operating point is an operating point of the engine 100, at which a power, torque and rotation speed of the engine 100 are determined. The operating point of the engine 100 is determined so that the engine 100 outputs a desired power or torque. In the first embodiment, the operating point is set so that the power of the engine 100 becomes a desired operating power. Other than a signal indicating the accelerator operation amount ACC and a signal indicating the vehicle speed VSS, signals are input to the controller 200 from various sensors, that is, a cam angle sensor 300, a crank angle sensor 302, a knock sensor 304 and a throttle opening degree sensor 306.

The cam angle sensor 300 outputs a signal indicating a cam position. The crank angle sensor 302 outputs signals indicating the rotation speed of the crankshaft 116 (engine rotation speed) and the rotation angle of the crankshaft 116. The knock sensor 304 outputs a signal indicating the strength of vibrations of the engine 100. The throttle opening degree sensor 306 outputs a signal indicating the throttle opening degree θth. The controller 200 controls the engine 100 on the basis of the signals from these sensors.

Figure 3:
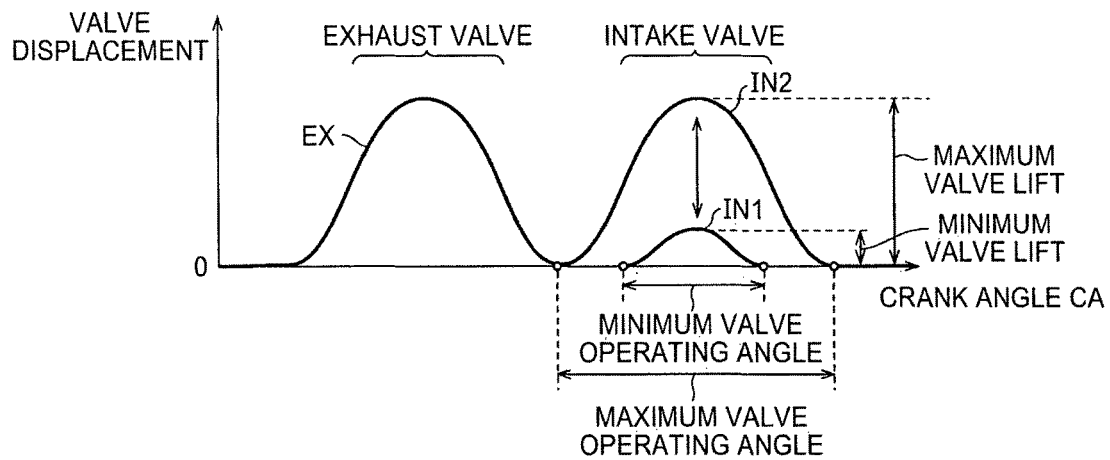
FIG. 3 is a graph that shows the correlation between a crank angle and a valve displacement that is achieved by a VVL device.

FIG. 3 is a graph that shows the correlation between a crank angle and a valve displacement that is achieved by the VVL device 400. As shown in FIG. 3, each exhaust valve 120 (FIG. 2) opens and closes in an exhaust stroke, and each intake valve 118 (FIG. 2) opens and closes in an intake stroke. A waveform EX indicates the valve displacement of each exhaust valve 120. Waveforms IN1, IN2 each indicate the valve displacement of each intake valve 118. The valve displacement is a displacement of a valve from a state where the valve is closed. In the following description, the valve lift is a valve displacement at the time when the opening degree of the intake valve 118 has reached a peak, and the valve operating angle is a crank angle of a period from when the intake valve 118 opens to when the intake valve 118 closes.

The operation characteristic of each intake valve 118 is changed by the VVL device 400 between the waveforms IN1, IN2. The waveform IN1 indicates the case where the valve lift and the valve operating angle are minimum. The waveform IN2 indicates the case where the valve lift and the valve operating angle are maximum. In the VVL device 400, the valve operating angle increases with an increase in the valve lift. In the first embodiment, the VVL device 400 is configured to be able to change the valve lift and the valve operating angle in three steps as shown later in FIG. 6.

Figure 4:
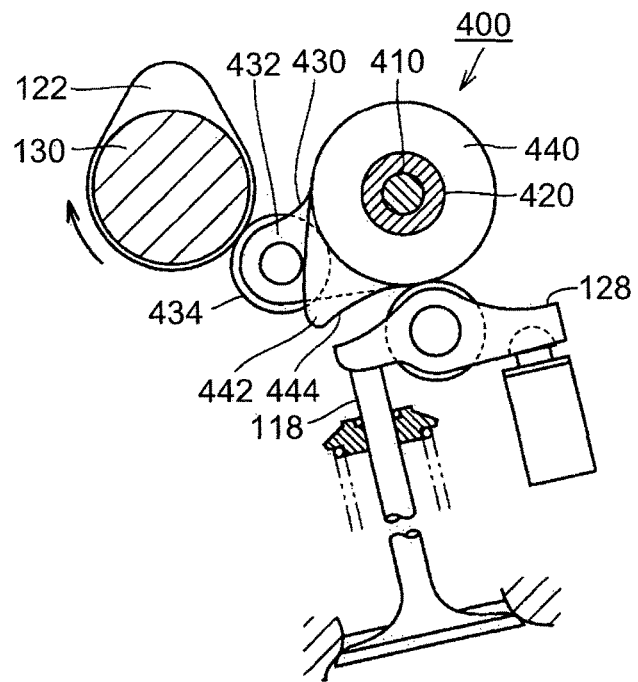
FIG. 4 is a front view of the VVL device.

FIG. 4 is a front view of the VVL device 400. The configuration shown in FIG. 4 is one example. The VVL device 400 is not limited to such a configuration. As shown in FIG. 4, the VVL device 400 includes a drive shaft 410, a support pipe 420, an input arm 430, and oscillation cams 440. The drive shaft 410 extends in one direction. The support pipe 420 covers the outer periphery of the drive shaft 410. The input arm 430 and the oscillation cams 440 are arranged in the axial direction of the drive shaft 410 on the outer periphery of the support pipe 420. An actuator (not shown) that linearly actuates the drive shaft 410 is connected to the distal end of the drive shaft 410.

The VVL device 400 includes the one input arm 430 in correspondence with the one cam 122 provided in each cylinder. The two oscillation cams 440 are provided on both sides of each input arm 430 in correspondence with the pair of intake valves 118 provided for each cylinder.

The support pipe 420 is formed in a hollow cylindrical shape, and is arranged parallel to a camshaft 130. The support pipe 420 is fixed to a cylinder head so as not to be moved in the axial direction or rotated.

The drive shaft 410 is inserted inside the support pipe 420 so as to be slidable in the axial direction. The input arm 430 and the two oscillation cams 440 are provided on the outer periphery of the support pipe 420 so as to be oscillatable about the axis of the drive shaft 410 and not to move in the axial direction.

The input arm 430 includes an arm portion 432 and a roller portion 434. The arm portion 432 protrudes in a direction away from the outer periphery of the support pipe 420. The roller portion 434 is rotatably connected to the distal end of the arm portion 432. The input arm 430 is provided such that the roller portion 434 is arranged at a position at which the roller portion 434 is able to contact the cam 122.

Each oscillation cam 440 has a substantially triangular nose portion 442 that protrudes in a direction away from the outer periphery of the support pipe 420. A concave cam face 444 is formed at one side of the nose portion 442. A roller rotatably attached to a rocker arm 128 is pressed against the cam face 444 by the urging force of a valve spring provided in the intake valve 118.

The input arm 430 and the oscillation cams 440 integrally oscillate about the axis of the drive shaft 410. Therefore, as the camshaft 130 rotates, the input arm 430 that is in contact with the cam 122 oscillates, and the oscillation cams 440 oscillate in interlocking with movement of the input arm 430. The movements of the oscillation cams 440 are transferred to the intake valves 118 via the rocker arms 128, and the intake valves 118 are opened or closed.

The VVL device 400 further includes a device that changes a relative phase difference between the input arm 430 and each oscillation cam 440 around the axis of the support pipe 420. The valve lift and valve operating angle of each intake valve 118 are changed as needed by the device that changes the relative phase difference.

That is, when the relative phase difference between the input arm 430 and each oscillation cam 440 is increased, the oscillation angle of each rocker arm 128 is increased with respect to the oscillation angle of each of the input arm 430 and the oscillation cams 440, and the valve lift and valve operating angle of each intake valve 118 are increased.

When the relative phase difference between the input arm 430 and each oscillation cam 440 is reduced, the oscillation angle of each rocker arm 128 is reduced with respect to the oscillation angle of each of the input arm 430 and the oscillation cams 440, and the valve lift and valve operating angle of each intake valve 118 are reduced.

Figure 5:
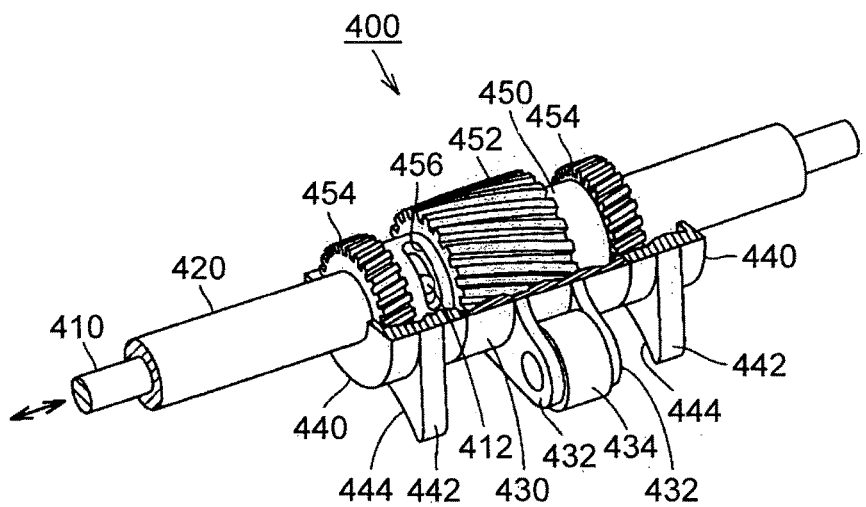
FIG. 5 is a perspective view that partially shows the VVL device shown in FIG. 4.

FIG. 5 is a perspective view that partially shows the VVL device 400 shown in FIG. 4. FIG. 5 shows a structure with part cut away so that the internal structure is understood. As shown in FIG. 5, a slider gear 450 is accommodated in a space defined between the outer periphery of the support pipe 420 and the set of input arm 430 and two oscillation cams 440. The slider gear 450 is supported on the support pipe 420 so as to be rotatable and slidable in the axial direction. The slider gear 450 is provided on the support pipe 420 so as to be slidable in the axial direction.

The slider gear 450 includes a helical gear 452. The helical gear 452 is located at the center portion of the slider gear 450 in the axial direction. Right-handed screw spiral helical splines are formed on the helical gear 452. The slider gear 450 includes helical gears 454. The helical gears 454 are respectively located on both sides of the helical gear 452. Left-handed screw spiral helical splines opposite to those of the helical gear 452 are formed on each of the helical gears 454.

On the other hand, helical splines corresponding to the helical gears 452, 454 are respectively formed on the inner peripheries of the input arm 430 and two oscillation cams 440. The inner peripheries of the input arm 430 and two oscillation cams 440 define a space in which the slider gear 450 is accommodated. That is, the right-handed spiral helical splines are formed on the input arm 430, and the helical splines are in mesh with the helical gear 452. The left-handed spiral helical splines are formed on each of the oscillation cams 440, and the helical splines are in mesh with the corresponding helical gear 454.

An oblong hole 456 is formed in the slider gear 450. The oblong hole 456 is located between the helical gear 452 and one of the helical gears 454, and extends in the circumferential direction. Although not shown in the drawing, an oblong hole is formed in the support pipe 420, and the oblong hole extends in the axial direction so as to partially overlap with the oblong hole 456. A locking pin 412 is integrally provided in the drive shaft 410 inserted inside the support pipe 420. The locking pin 412 protrudes through the overlapped portions of these oblong hole 456 and oblong hole (not shown).

When the drive shaft 410 is moved in the axial direction by the actuator (not shown) coupled to the drive shaft 410, the slider gear 450 is pressed by the locking pin 412, and the helical gears 452, 454 move in the axial direction of the drive shaft 410 at the same time. When the helical gears 452, 454 are moved in this way, the input arm 430 and the oscillation cams 440 spline-engaged with these helical gears 452, 454 do not move in the axial direction. Therefore, the input arm 430 and the oscillation cams 440 pivot around the axis of the drive shaft 410 through meshing of the helical splines.

At this time, the helical splines respectively formed on the input arm 430 and each oscillation cam 440 have opposite orientations. Therefore, the pivot direction of the input arm 430 and the pivot direction of each oscillation cam 440 are opposite to each other. Thus, the relative phase difference between the input arm 430 and each oscillation cam 440 changes, with the result that the valve lift and valve operating angle of each intake valve 118 are changed as is already described.

The VVL device 400 is not limited to this type. For example, a VVL device that electrically drives each valve, a VVL device that hydraulically drives each valve, or the like, may be used.

The controller 200 (shown in FIG. 2) controls the valve lift and valve operating angle of each intake valve 118 by adjusting an operation amount of the actuator that linearly moves the drive shaft 410.

Figure 6:
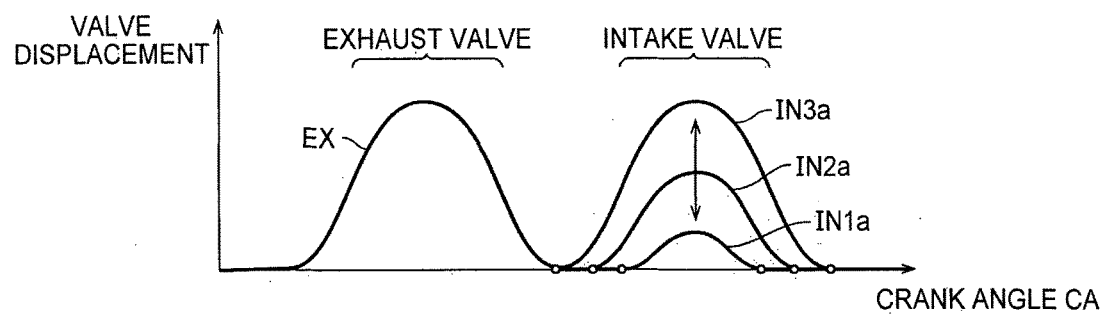
FIG. 6 is a graph that shows the correlation between a crank angle and a valve displacement that is achieved by the VVL device that is able to change the operation characteristic of each intake valve in three steps.

FIG. 6 is a graph that shows the correlation between a crank angle and a valve displacement that is achieved by the VVL device 400 that is able to change the operation characteristic of each intake valve 118 in three steps. As shown in FIG. 6, the VVL device 400 is able to change the operation characteristic of each intake valve 118 to any one of first to third characteristics. The first characteristic is indicated by a waveform IN1a. The second characteristic is indicated by a waveform IN2a. The valve lift and the valve operating angle in the second characteristic are larger than the valve lift and the valve operating angle in the first characteristic. The third characteristic is indicated by a waveform IN3a. The valve lift and the valve operating angle in the third characteristic are larger than the valve lift and the valve operating angle in the second characteristic In the VVL device 400 that is able to change the operation characteristic of each intake valve 118 in three steps the first characteristic (waveform IN1a) of which the valve lift and the valve operating angle are relatively small among the three operation characteristics is also referred to as "small cam characteristic", and the third characteristic (waveform IN3a) of which the valve lift and the valve operating angle are relatively large among the three operation characteristics is also referred to as "large cam characteristic". The second characteristic (waveform IN2a) of which the valve lift and the valve operating angle are larger than the small cam characteristic and smaller than the large cam characteristic is also referred to as "intermediate cam characteristic".

Figure 7:
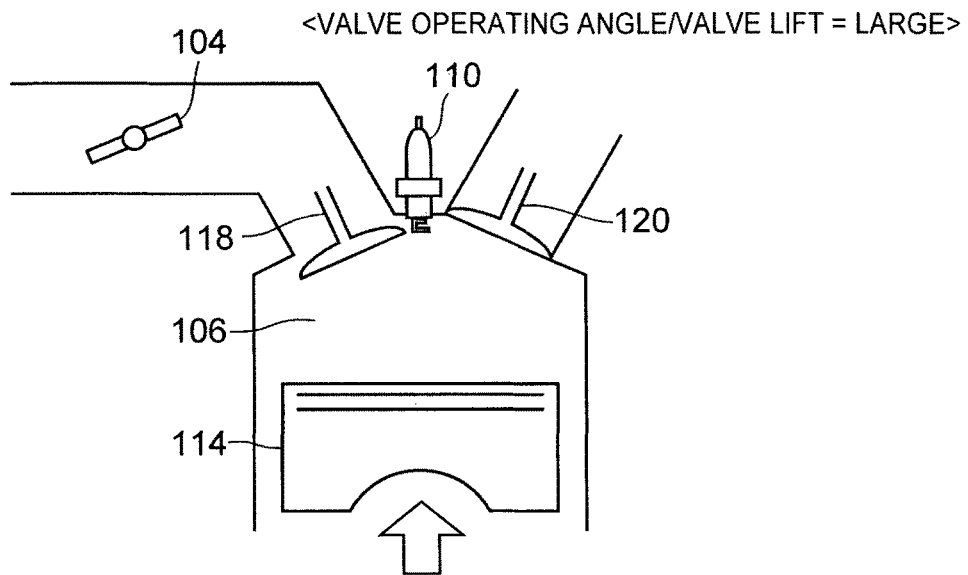
FIG. 7 is a view that illustrates an operation when a piston moves upward in a state where the operation characteristic of each intake valve is a large cam characteristic.

FIG. 7 is a view that illustrates an operation when the piston moves upward in a state where the operation characteristic of each intake valve 118 is the large cam characteristic. As shown in FIG. 7, when the operation characteristic of each intake valve 118 is the large cam characteristic, the close timing of each intake valve 118 delays when the corresponding piston 114 moves upward. Thus, the engine 100 runs on the Atkinson cycle, and fuel economy is improved. On the other hand, part of air-fuel mixture taken into the cylinder 106 in an intake stroke is returned to the outside of the cylinder 106, with the result that the compression ratio of air-fuel mixture in the cylinder 106 decreases (decompression), so ignitability of air-fuel mixture deteriorates. Thus, the output of the engine 100 decreases as compared to the case where the operation characteristic of each intake valve 118 is the small cam characteristic or the intermediate cam characteristic. In addition, a combustion state of air-fuel mixture tends to deteriorate, and emissions in exhaust gas deteriorate.

Figure 8:
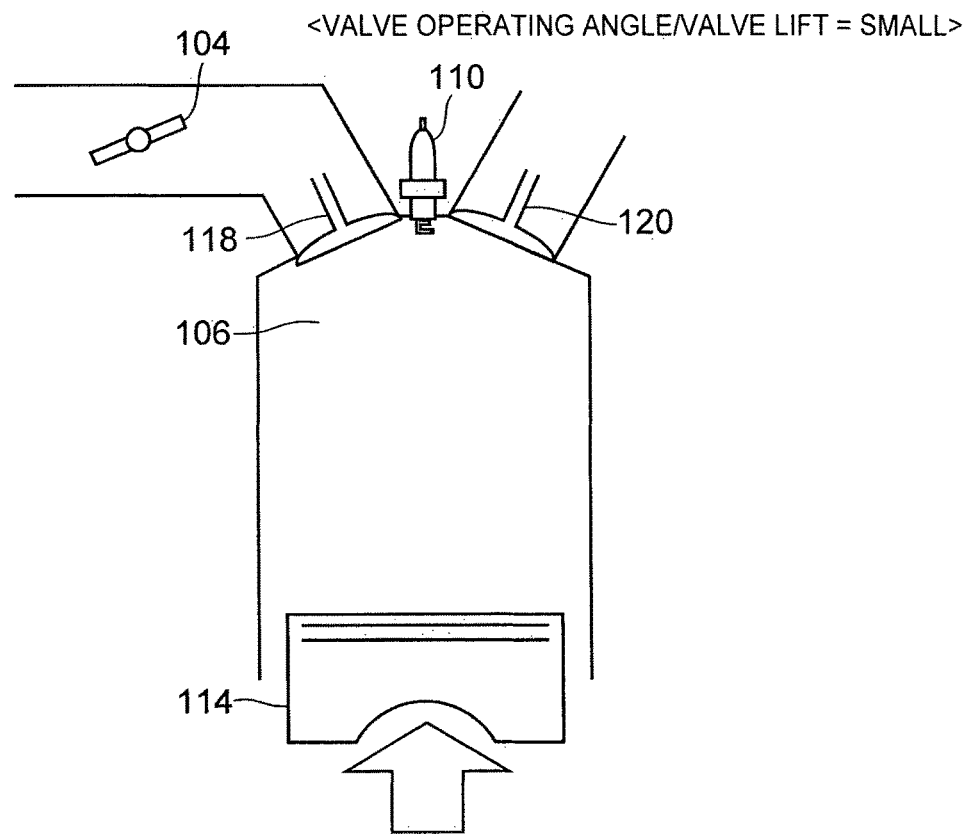
FIG. 8 is a view that illustrates an operation when the piston moves upward in a state where the operation characteristic of each intake valve is a small cam characteristic.
Figure 9:
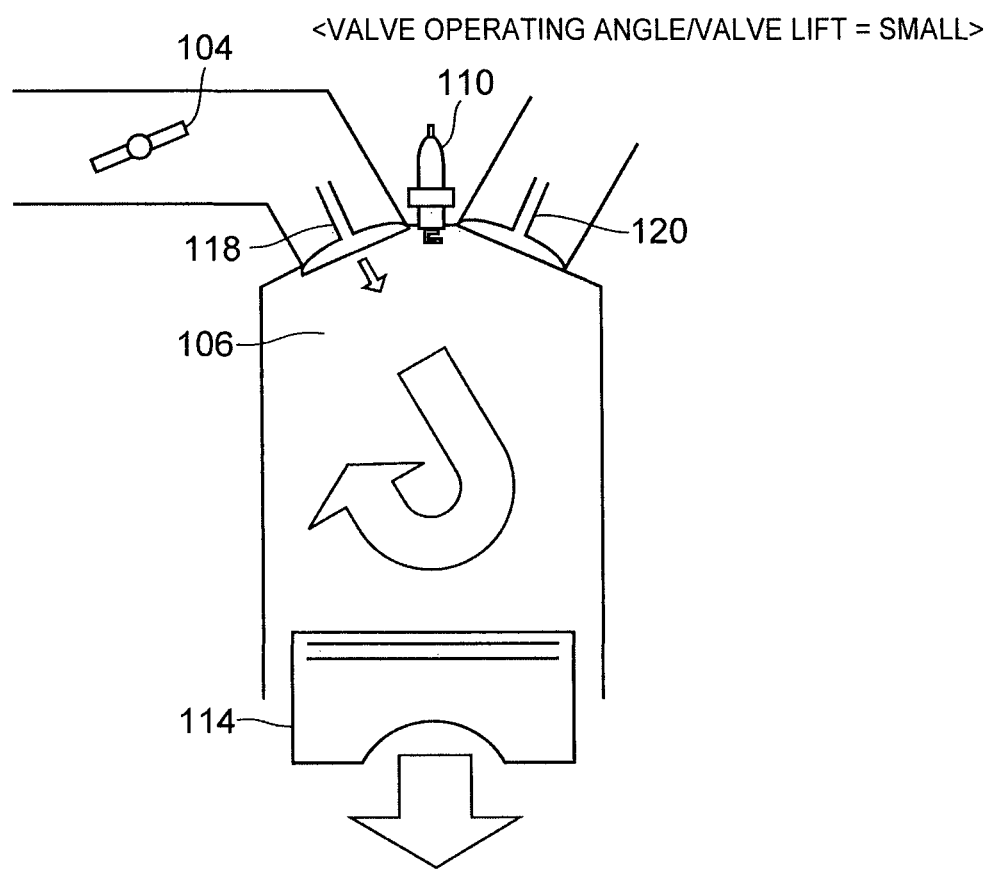
FIG. 9 is a view that illustrates an operation when the piston moves downward in a state where the operation characteristic of each intake valve is a small cam characteristic.

FIG. 8 is a view that illustrates an operation when the piston moves upward in a state where the operation characteristic of each intake valve 118 is the small cam characteristic. FIG. 9 is a view that illustrates an operation when the piston moves downward in a state where the operation characteristic of each intake valve 118 is the small cam characteristic. As shown in FIG. 8 and FIG. 9, when the operation characteristic of each intake valve 118 is the small cam characteristic, because the open timing of each intake valve 118 delays when the corresponding piston 114 moves downward, air-fuel mixture is taken in from the corresponding intake port in a state where a negative pressure is generated in the cylinder 106, so mixing of fuel in the cylinder 106 is facilitated. In addition, because the close timing of each intake valve 118 advances when the corresponding piston 114 moves upward, the compression ratio of air-fuel mixture in the cylinder 106 increases, so ignitability of air-fuel mixture improves. With these operations, the output of the engine 100 increases as compared to the case where the operation characteristic of each intake valve 118 is the large cam characteristic or the intermediate cam characteristic. In addition, the combustion state of air-fuel mixture becomes a good condition, so emissions in exhaust gas are improved. On the other hand, a pumping loss increases, so fuel economy relatively deteriorates.

Referring back to FIG. 1 and FIG. 2, the hybrid vehicle 1 is able to stop the engine 100 and travel by using the motor generator MG2 (EV mode). When a predetermined engine start-up condition is satisfied in an engine stopped state, an engine start-up process is executed, so the hybrid vehicle 1 shifts from the engine stopped state to an engine operated state. The engine start-up condition is satisfied, for example, when an output (power or torque) that is required of the hybrid vehicle 1 exceeds a predetermined threshold or when it is determined that it is required to warm up the S/C catalyst 112S (FIG. 2) provided in the exhaust passage.

When a predetermined catalyst warm-up condition for requiring warm-up of the S/C catalyst 112S is satisfied, the controller 200 executes catalyst warm-up control for warming up the S/C catalyst 112S by starting up the engine 100. The controller 200 executes catalyst warm-up control by separating the catalyst warm-up control into two steps, that is, first warm-up control and second warm-up control. That is, the first warm-up control is executed just after start-up of the engine 100. The controller 200 operates the engine 100 at a first operating power (for example, a low power of about 0 to 3 kW), and operates the engine 100 while the ignition timing of the engine 100 is retarded. This is to early warm up the S/C catalyst 112S by suppressing the amount of exhaust gas as a result of suppressing the power of the engine 100 and increasing the temperature of exhaust gas as a result of retarding the ignition timing. The first operating power does not respond to a traveling power. The traveling power is output from the motor generator MG2.

When the exhaust gas upstream side of the S/C catalyst 112S is warmed up through the first warm-up control and, as a result, a minimum exhaust gas purification ability is ensured, the controller 200 executes the second warm-up control. That is, the controller 200 returns the ignition timing of the engine 100, which has been controlled to the retarded side, to an ordinary state, and operates the engine 100 at a second operating power larger than the first operating power. The second operating power does not respond to a traveling power, and is set to a predetermined value that does not exceed the exhaust gas purification ability of the S/C catalyst 112S. The predetermined value may be a constant value or may be increased stepwise with an increase in the exhaust gas purification ability of the S/C catalyst 112S (with an increase in the temperature of the S/C catalyst 112S). During then, the traveling power is output from the motor generator MG2.

When the entire S/C catalyst 112S is warmed up and the exhaust gas purification ability of the S/C catalyst 112S reaches 100%, the controller 200 operates the engine 100 on the basis of the traveling power (hereinafter, referred to as "ordinary control" in contrast with the catalyst warm-up control). In the ordinary control, the hybrid vehicle 1 travels by driving the motor generator MG2 and the engine 100 on the basis of the traveling power (HV mode).

In the above-described catalyst warm-up control, during execution of the second warm-up control, the engine 100 is operated at the second operating power larger than the operating power (first operating power) during execution of the first warm-up control. When the traveling power of the hybrid vehicle 1 is small, part of the output of the engine 100 is converted to electric power by the motor generator MG1, and becomes electric power for charging the electrical storage device 10. In addition, when the SOC of the electrical storage device 10 is high, charging of the electrical storage device 10 is limited, so electric power generated by the motor generator MG1 cannot be absorbed by the electrical storage device 10. In such a case, it is not possible to operate the engine 100 at the second operating power, so it is not possible to continue the second warm-up control.

Therefore, in the hybrid vehicle 1, when the SOC of the electrical storage device 10 is high and charging of the electrical storage device 10 is limited, the operation characteristic of each intake valve 118 is changed so as to increase the valve lift and valve operating angle of each intake valve 118. As an example, in this first embodiment, during execution of the first warm-up control just after engine start-up, suppression of emissions in exhaust gas is given a higher priority, and the operation characteristic of each intake valve 118 is set to the small cam characteristic. After that, when the catalyst warm-up control is changed from the first warm-up control to the second warm-up control, the operation characteristic of each intake valve 118 is changed to the intermediate cam characteristic for the purpose of achieving both suppression of emissions and improvement in fuel economy. When the SOC of the electrical storage device 10 exceeds a predetermined value during execution of the second warm-up control, the operation characteristic of each intake valve 118 is changed from the intermediate cam characteristic to the large cam characteristic. Thus, the output of the engine 100 decreases because of decompression, so it is possible to continue the second warm-up control.

The small cam characteristic may be kept even when the catalyst warm-up control has changed from the first warm-up control to the second warm-up control, and, when the SOC of the electrical storage device 10 exceeds the predetermined value during execution of the second warm-up control, the operation characteristic of each intake valve 118 may be changed to the intermediate cam characteristic or the large cam characteristic.

Figure 10:
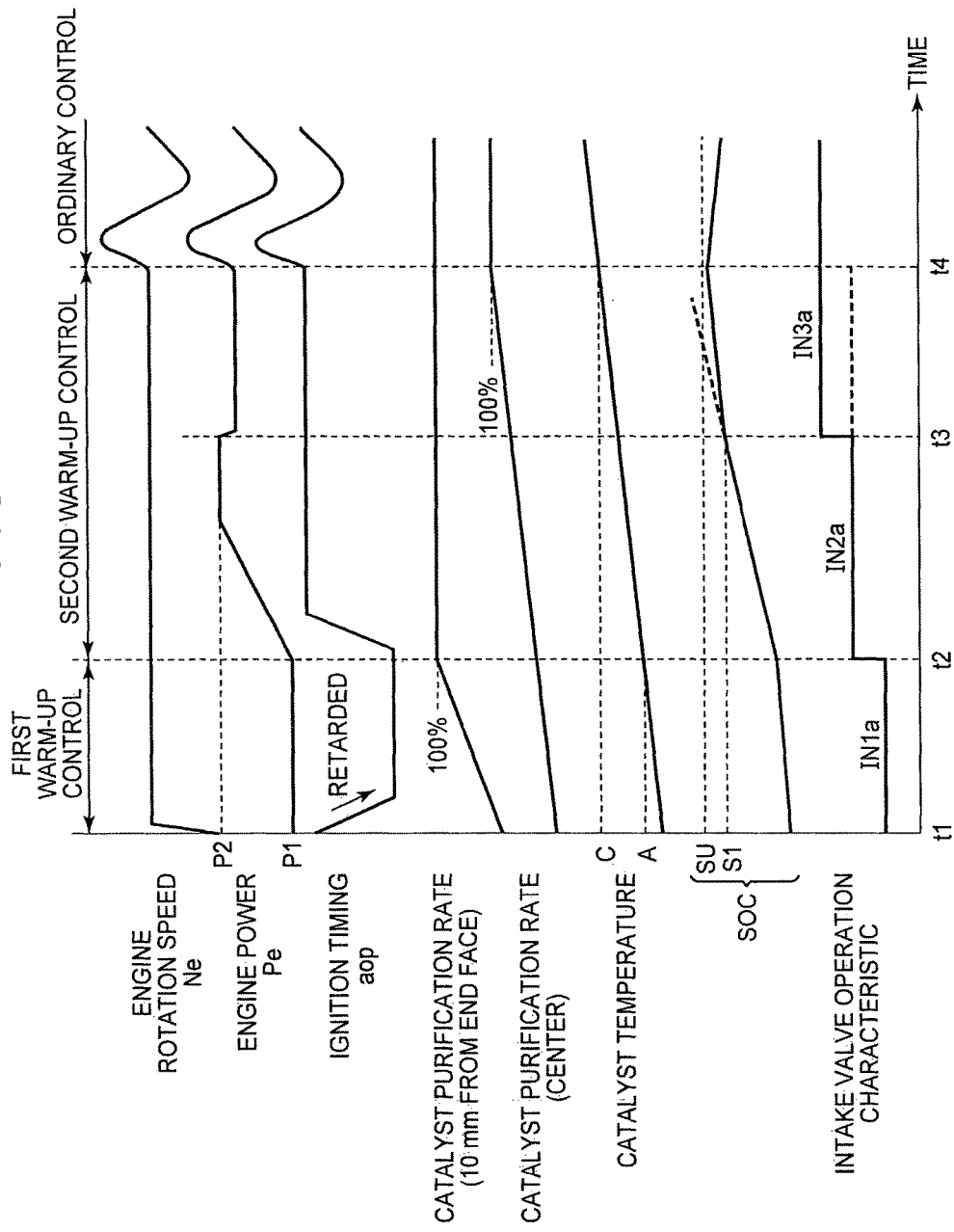
FIG. 10 is a waveform chart for illustrating a controlled state of the engine in catalyst warm-up control.

FIG. 10 is a waveform chart for illustrating a controlled state of the engine 100 in catalyst warm-up control. As shown in FIG. 10, the abscissa axis represents time, and the ordinate axes respectively represent the waveforms of from the top, the engine rotation speed Ne, the engine power Pe, the ignition timing aop of the engine 100, a purification rate at an exhaust gas upstream end (for example, a location 10 mm from the end face) of the S/C catalyst 112S, a purification rate at the center of the S/C catalyst 112S, the temperature of the S/C catalyst 112S, the SOC of the electrical storage device 10, and the set operation characteristic of each intake valve 118.

The purification rate is defined by the ratio of the emission concentration of exhaust gas output with respect to the emission concentration (typically, HC concentration) of exhaust gas input, and is, actually, estimated on the basis of a catalyst temperature by using a prepared map, relational expression, or the like. The catalyst temperature is estimated from the intake air amount and ignition retardation amount of the engine 100 by using a prepared map, relational expression, or the like.

The catalyst purification rate (10 mm from the end face) is a purification rate at the exhaust gas upstream end of the S/C catalyst 112S. The catalyst purification rate indicates a purification rate at a location 10 mm from the exhaust gas upstream end face as an example, and, hereinafter, is also referred to as "end face purification rate". The catalyst purification rate (center) indicates a purification rate of the entire S/C catalyst 112S, and, hereinafter, is also referred to as "center purification rate".

It is assumed that, at time t1, the warm-up condition for the S/C catalyst 112S is satisfied, and the engine 100 starts up in order to warm up the S/C catalyst 112S. At time t2, until the end face purification rate of the S/C catalyst 112S reaches 100%, the first warm-up control is executed. That is, the engine rotation speed Ne is constant, and the engine power Pe is set to a first operating power P1 (for example, a low power of about 0 to 3 kW). The traveling power of the hybrid vehicle 1 is output from the motor generator MG2. The ignition timing aop of the engine 100 is controlled to a retarded side, with the result that the temperature of combustion gas (exhaust gas) is increased.

During execution of the first warm-up control, the engine 100 is still low in temperature and the ignition timing aop is also controlled to the retarded side, and the combustion state of the engine 100 is instable. Therefore, the operation characteristic of each intake valve 118 is set to the small cam characteristic (IN1a in FIG. 6). Thus, as described with reference to FIG. 9, the combustion state of air-fuel mixture is placed in a good condition, with the result that suppression of emissions in exhaust gas is achieved.

When the catalyst temperature reaches a predetermined value A and it is determined that the end face purification rate of the S/C catalyst 112S has reached 100% at time t2, the catalyst warm-up control changes from the first warm-up control to the second warm-up control. That is, the ignition timing aop of the engine 100 is returned from the retarded side to the ordinary state, and the engine power Pe is set to a second operating power P2 larger than the first operating power P1. As described above, the second operating power P2 does not respond to the traveling power, and is set to the predetermined value that does not exceed the exhaust gas purification ability of the S/C catalyst 112S. The second operating power P2 may be a constant value or may be increased with an increase in the exhaust gas purification ability of the S/C catalyst 112S (an increase in the temperature of the S/C catalyst 112S). The traveling power is output from the motor generator MG2. The engine power Pe is stably controlled irrespective of the traveling power, with the result that warm-up of the S/C catalyst 112S is continued in a state where the operation of the engine 100 is stable.

In addition, when the second warm-up control is started at time t2, the operation characteristic of each intake valve 118 is changed from the small cam characteristic to the intermediate cam characteristic (IN2a in FIG. 6). In the initial stage in which control for returning the engine ignition timing aop at which combustion becomes instable is executed and the combustion temperature is not still sufficiently high, the operation characteristic is set to the intermediate cam characteristic. Thus, fuel economy is improved as compared to the first warm-up control, and emissions are suppressed as a result of improvement in combustion.

The SOC of the electrical storage device 10 can increase or decrease depending on the traveling condition. However, FIG. 10 shows the case where the traveling power of the hybrid vehicle 1 is small and the SOC increases during execution of the second warm-up control. When the SOC of the electrical storage device 10 reaches a value S1 that indicates an increase in SOC at time t3, the operation characteristic of each intake valve 118 is changed to the large cam characteristic (IN3a in FIG. 6). Thus, the output of the engine 100 is suppressed because of decompression, and the degree of increase in SOC is suppressed (the SOC may start decreasing depending on the traveling condition.). As a result, it is possible to continue the second warm-up control. If the operation characteristic of each intake valve 118 is not changed to the large cam characteristic at time t3, the SOC continues increasing and reaches an upper limit value SU as indicated by the dashed line, and there is a possibility that the engine 100 and the second warm-up control stop.

When the catalyst temperature reaches a predetermined value C and it is determined that the center purification rate of the S/C catalyst 112S has reached 100% at time t4, the catalyst warm-up control (second warm-up control) completes, and ordinary control is executed. In this ordinary control, the engine 100 is operated on the basis of the traveling power, and the operation characteristic of each intake valve 118 is controlled by the VVL device 400 on the basis of the engine rotation speed Ne and the engine torque (not shown).

Figure 11:
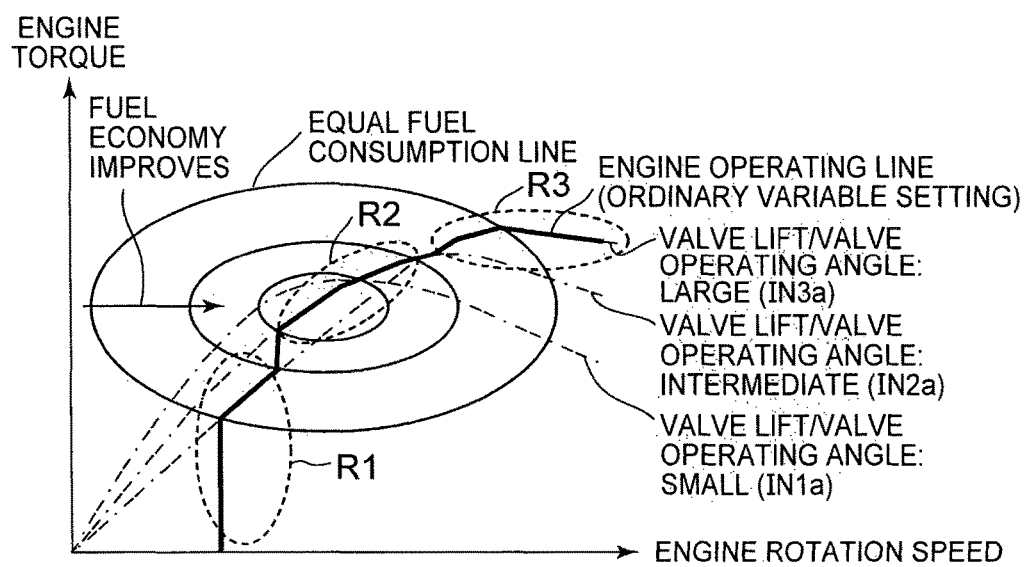
FIG. 11 is a graph that shows a setting example of the operation characteristic of each intake valve in ordinary control.

FIG. 11 is a graph that shows a setting example of the operation characteristic of each intake valve 118 in ordinary control. As shown in FIG. 11, the abscissa axis represents engine rotation speed, and the ordinate axis represents engine torque. The lines indicated by the alternate long and short dashed line indicate torque characteristics respectively corresponding to the first to third characteristics (IN1a to IN3a). The circles indicated by the continuous line indicate equal fuel consumption lines. The fuel economy improves as approaching the center of the circles. The engine 100 is basically operated along the engine operating line indicated by the continuous line.

In a low rotation speed region indicated by the region R1, it is important to suppress vibrations of the engine. In this low rotation speed region, introduction of EGR gas is stopped, and fuel economy is improved by using the Atkinson cycle. Thus, in the region R1, the second characteristic (IN2a) is selected as the operation characteristic of each intake valve 118 such that the valve lift and the valve operating angle increase. In an intermediate rotation speed region indicated by the region R2, fuel economy is improved by increasing the amount of introduction of EGR gas. Thus, in the region R2, the third characteristic (IN3a) is selected as the operation characteristic of each intake valve 118 such that the valve lift and the valve operating angle are intermediate.

That is, when the valve lift and valve operating angle of each intake valve 118 are large (second characteristic), improvement in fuel economy by using the Atkinson cycle is given a higher priority than improvement in fuel economy by introduction of EGR gas. On the other hand, when the intermediate valve lift and valve operating angle are selected (third characteristic), improvement in fuel economy by introduction of EGR gas is given a higher priority than improvement in fuel economy by using the Atkinson cycle.

In a high rotation speed region indicated by the region R3, a large amount of air is introduced into each cylinder by the inertia of intake air, and the output performance is improved by increasing an actual compression ratio. Thus, in the region R3, the second characteristic (IN2a) is selected as the operation characteristic of each intake valve 118 such that the valve lift and the valve operating angle increase. In this way, the valve lift and the valve operating angle are determined in accordance with the operating state of the engine 100.

Referring back to FIG. 10, FIG. 10 shows the case where the traveling power of the hybrid vehicle 1 is small and the SOC increases during execution of the second warm-up control; however, when the traveling power of the hybrid vehicle 1 is large, driving force generated by the motor generator MG2 also increases, so electric power is consumed (discharged) from the electrical storage device 10. When the SOC of the electrical storage device 10 is low, discharging of the electrical storage device 10 is limited, so the output of the motor generator MG2 decreases. Thus, it is required to increase the output of the engine 100 in order to ensure the traveling power. In this case as well, it is not possible to operate the engine 100 at the second operating power, and it is not possible to continue the second warm-up control.

Therefore, in the hybrid vehicle 1, when the SOC of the electrical storage device 10 is low and discharging of the electrical storage device 10 is limited, the operation characteristic of each intake valve 118 is changed so as to reduce the valve lift and valve operating angle of each intake valve 118. As an example, when the SOC of the electrical storage device 10 becomes lower than a predetermined value during execution of the second warm-up control, the operation characteristic of each intake valve 118 is changed from the intermediate cam characteristic to the small cam characteristic. Thus, the output of the engine 100 increases as a result of an increase in the compression ratio of air-fuel mixture, so it is possible to continue the second warm-up control even when discharging of the electrical storage device 10 is limited.

In the case where the operation characteristic of each intake valve 118 is changed to the large cam characteristic during execution of the second warm-up control, when the SOC of the electrical storage device 10 becomes lower than the predetermined value, the operation characteristic of each intake valve 118 may be changed from the large cam characteristic to the intermediate cam characteristic or the small cam characteristic.

Figure 12:
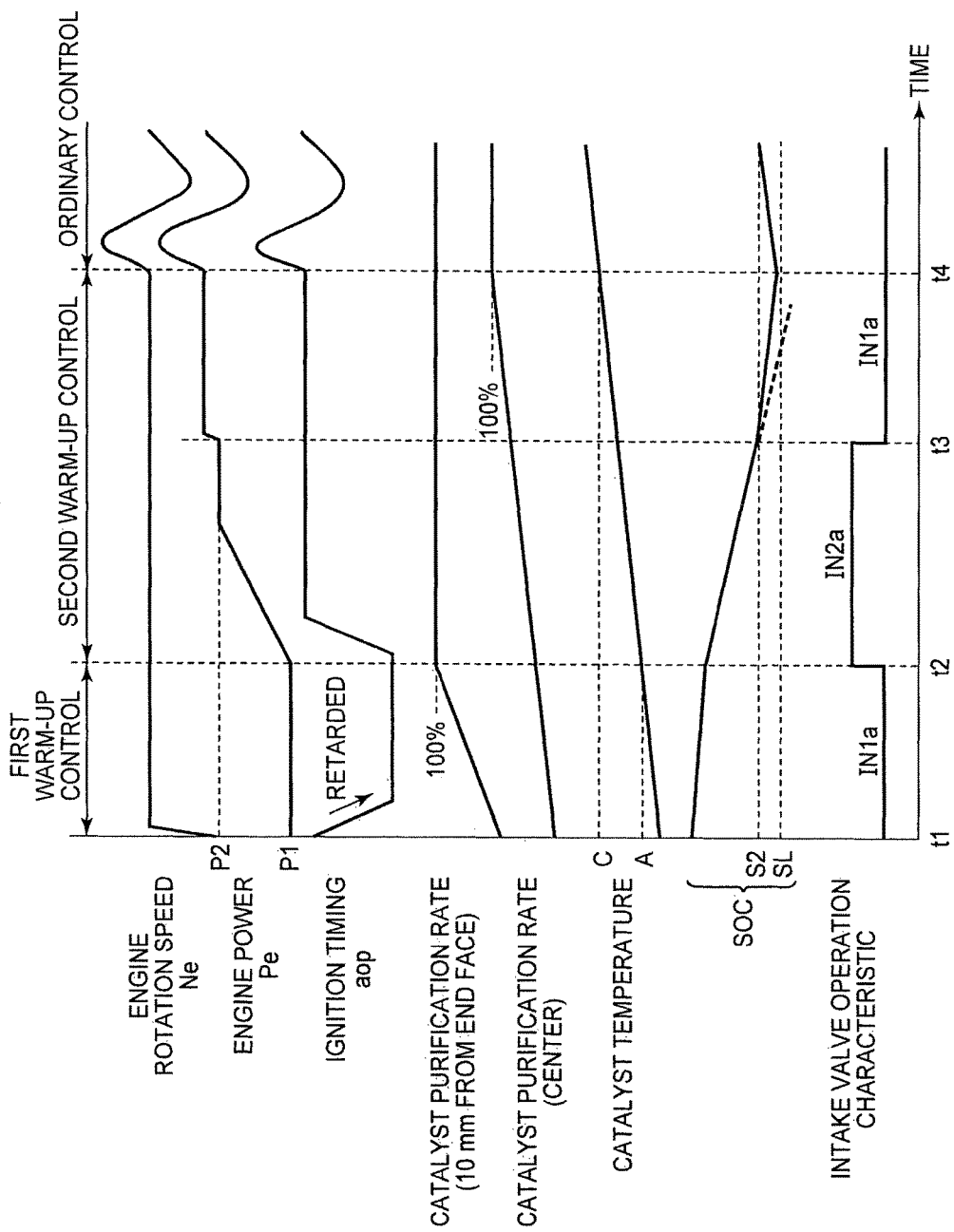
FIG. 12 is another waveform chart for illustrating a controlled state of the engine in catalyst warm-up control.

FIG. 12 is another waveform chart for illustrating a controlled state of the engine 100 in catalyst warm-up control. FIG. 12 shows the case where the traveling power of the hybrid vehicle 1 is large and the SOC decreases during execution of the second warm-up control.

As shown in FIG. 12, during execution of the second warm-up control, when the SOC reaches a value S2 that indicates a decrease in the SOC of the electrical storage device 10 at time t3, the operation characteristic of each intake valve 118 is changed from the intermediate cam characteristic to the small cam characteristic. Thus, the output of the engine 100 increases, and the degree of decrease in SOC is suppressed (the SOC may start increasing depending on the traveling condition). As a result, it is possible to continue the second warm-up control.

If the operation characteristic of each intake valve 118 is not changed to the small cam characteristic at time t3, the SOC continues decreasing and reaches a lower limit value SL as indicated by the dashed line, and there is a possibility that the second warm-up control stops.

Figure 13:
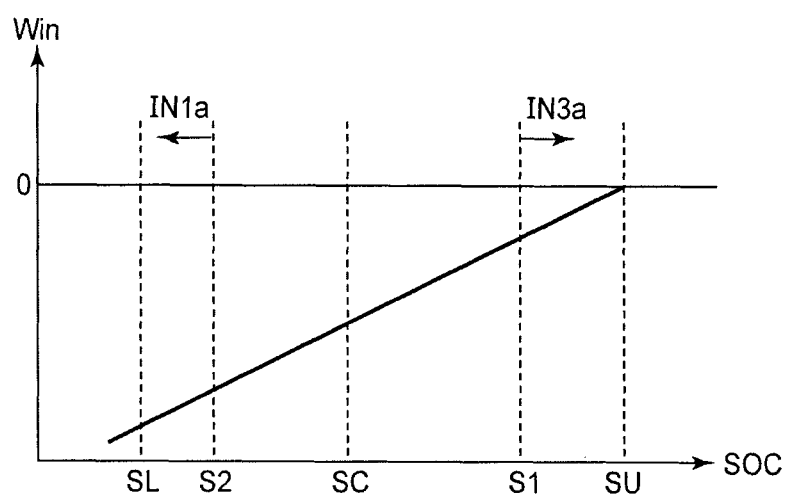
FIG. 13 is a graph that shows the correlation between an SOC of an electrical storage device and a charge power upper limit value Win.

FIG. 13 is a graph that shows the correlation between an SOC of the electrical storage device 10 and a charge power upper limit value Win. In the following description, the sign of electric power for discharging the electrical storage device 10 is a positive value, and the sign of electric power for charging the electrical storage device 10 is a negative value. Thus, the charge power upper limit value Win is also indicated by a negative value.

As shown in FIG. 13, when the SOC increases, the value of the charge power upper limit value Win increases (the absolute value of the charge power upper limit value Win decreases). That is, as the SOC increases, charging of the electrical storage device 10 is limited. Values SU, SL on the abscissa axis respectively indicate the upper limit value and lower limit value of the SOC, and a value SC indicates a control center of the SOC. When the SOC becomes higher than the value S1 that indicates an increase in SOC during execution of the second warm-up control, the operation characteristic of each intake valve 118 is set to the large cam characteristic (IN2a). On the other hand, when the SOC becomes lower than the value S2 that indicates a decrease in SOC during execution of the second warm-up control, the operation characteristic of each intake valve 118 is set to the small cam characteristic (IN1a).

Although setting of the operation characteristic at the time when the SOC is a value between the value S2 and the value S1 is not shown in the graph, in this first embodiment, when the catalyst warm-up control changes from the first warm-up control to the second warm-up control, the operation characteristic of each intake valve 118 is changed from the small cam characteristic to the intermediate cam characteristic (IN2a). Thus, the operation characteristic at the time when the SOC is a value between the value S2 and the value S1 during execution of the second warm-up control is often set to the intermediate cam characteristic (IN2a).

Figure 14:
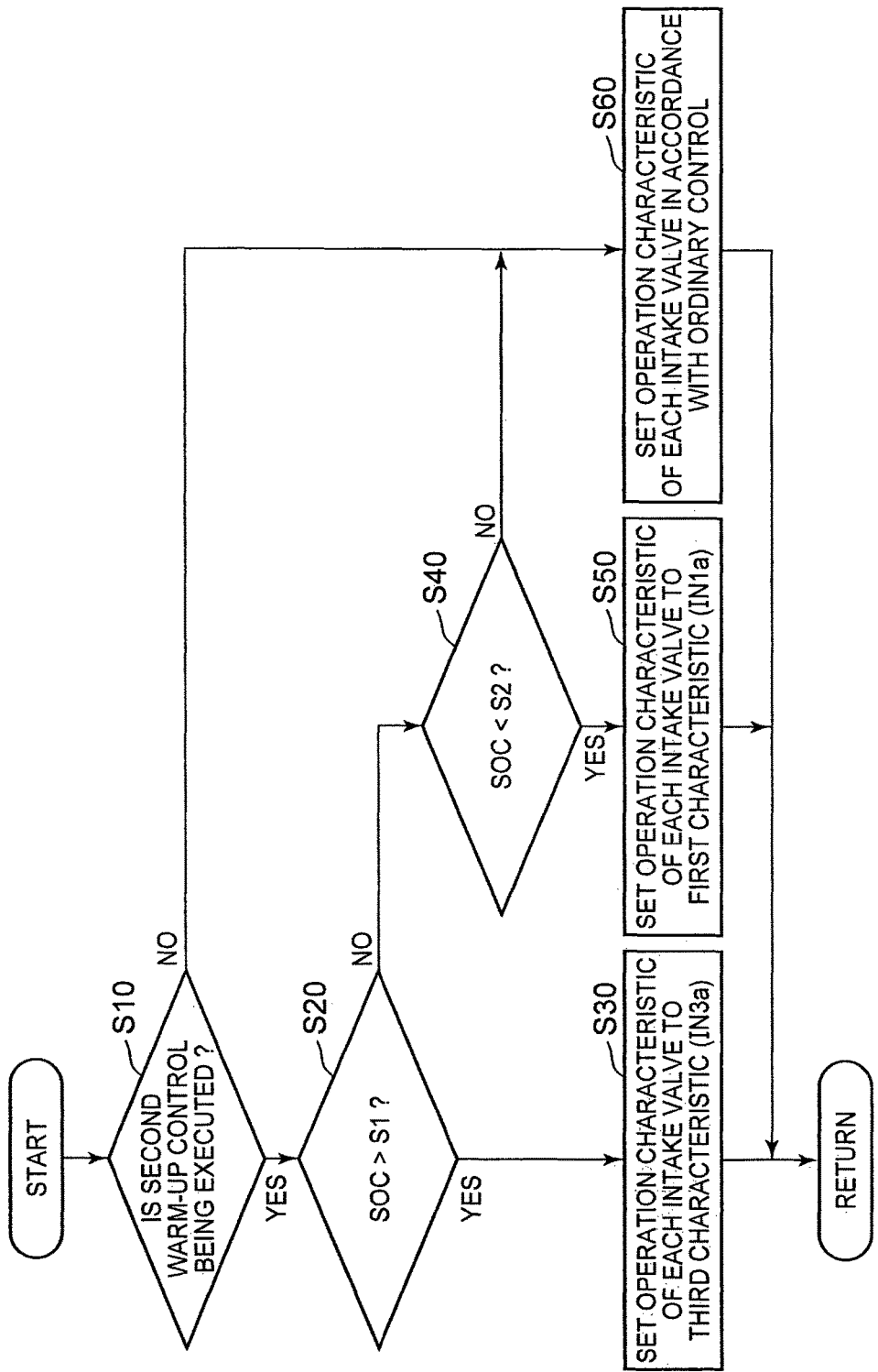
FIG. 14 is a flowchart that illustrates the process of setting the operation characteristic of each intake valve during execution of second warm-up control.

FIG. 14 is a flowchart that illustrates the process of setting the operation characteristic of each intake valve 118 during execution of the second warm-up control. This flowchart is implemented by the controller 200 executing a prestored program at predetermined intervals. Alternatively, the processes of part of the steps may be implemented by constructing exclusive hardware (electronic circuit).

As shown in FIG. 14, the controller 200 determines whether the second warm-up control is being executed (step S10). As an example, when a predetermined catalyst warm-up condition is satisfied and the temperature of the S/C catalyst 112S exceeds the predetermined value A (FIG. 10), it is determined that the second warm-up control is being executed.

When it is determined in step S10 that the second warm-up control is being executed (YES in step S10), the controller 200 determines whether the SOC of the electrical storage device 10 is higher than the value S1 (FIG. 10, FIG. 13) (step S20). When it is determined that the SOC is higher than the value S1 (YES in step S20), the controller 200 controls the VVL device 400 so that the operation characteristic of each intake valve 118 is set to the third characteristic (IN3a), that is, the large cam characteristic, by the VVL device 400 (step S30).

On the other hand, when it is determined in step S20 that the SOC is lower than or equal to the value S1 (NO in step S20), the controller 200 determines whether the SOC is lower than the value S2 (FIG. 12, FIG. 13) (step S40). When it is determined that the SOC is lower than the value S2 (YES in step S40), the controller 200 controls the VVL device 400 so that the operation characteristic of each intake valve 118 is set to the first characteristic (IN1a), that is, the small cam characteristic (step S50).

When it is determined in step S40 that the SOC is higher than or equal to the value S2 (NO in step S40) or when it is determined in step S10 that the second warm-up control is not being executed (NO in step S10), the operation characteristic of each intake valve 118 is set in accordance with the ordinary control as described with reference to, for example, FIG. 11 (step S60).

As described above, in this first embodiment, during execution of the second warm-up control, the VVL device 400 is controlled so that the valve lift and valve operating angle of each intake valve 118 are increased as the SOC of the electrical storage device 10 increases. In other words, during execution of the second warm-up control, the VVL device 400 is controlled so that the valve lift and valve operating angle of each intake valve 118 are reduced as the SOC of the electrical storage device 10 decreases. Thus, an increase in SOC is suppressed by suppressing the output of the engine 100 as the SOC increases, and a decrease in SOC is suppressed by increasing the output of the engine 100 as the SOC decreases, with the result that it is possible to avoid a situation that the second warm-up control is stopped on the basis of the SOC requirement. The output of the internal combustion engine is adjusted by changing the operation characteristic of each intake valve 118, so it is not required to adjust the throttle valve. Thus, according to the first embodiment, it is possible to continue the catalyst warm-up control without deterioration of fuel economy or emissions in exhaust gas.

In the above-described first embodiment, when the second warm-up control is started, the operation characteristic of each intake valve 118 is set to the intermediate cam characteristic, and, when the SOC becomes higher than the value S1 during execution of the second warm-up control, the operation characteristic of each intake valve 118 is changed from the intermediate cam characteristic to the large cam characteristic, and it is possible to continue the second warm-up control.

Even when the catalyst warm-up control changes from the first warm-up control to the second warm-up control, suppression of emissions resulting from improvement in combustion may be given a higher priority, and the operation characteristic of each intake valve 118 may be kept at the small cam characteristic. When the SOC has increased during execution of the second warm-up control, the operation characteristic of each intake valve 118 may be changed from the small cam characteristic to the intermediate cam characteristic and the large cam characteristic in a stepwise manner with an increase in SOC. Thus, it is possible to continue the second warm-up control while taking suppression of emissions into consideration.

Figure 15:
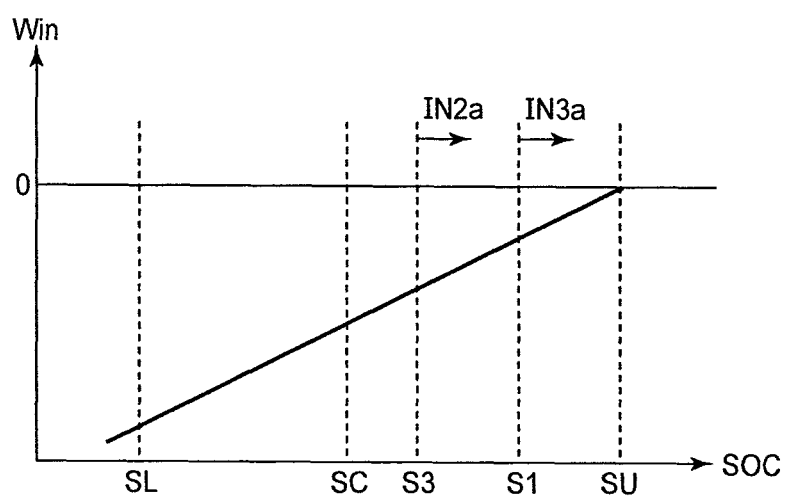
FIG. 15 is a graph that shows the correlation between an SOC of the electrical storage device and a charge power upper limit value Win.

FIG. 15 is a graph that shows the correlation between an SOC of the electrical storage device 10 and a charge power upper limit value Win. As shown in FIG. 15, when the SOC exceeds a value S3 (S3<S1) during execution of the second warm-up control, the operation characteristic of each intake valve 118 is set to the intermediate cam characteristic (IN2a). When the SOC further increases and becomes higher than the value S1, the operation characteristic of each intake valve 118 is set to the large cam characteristic (IN3a).

Figure 16:
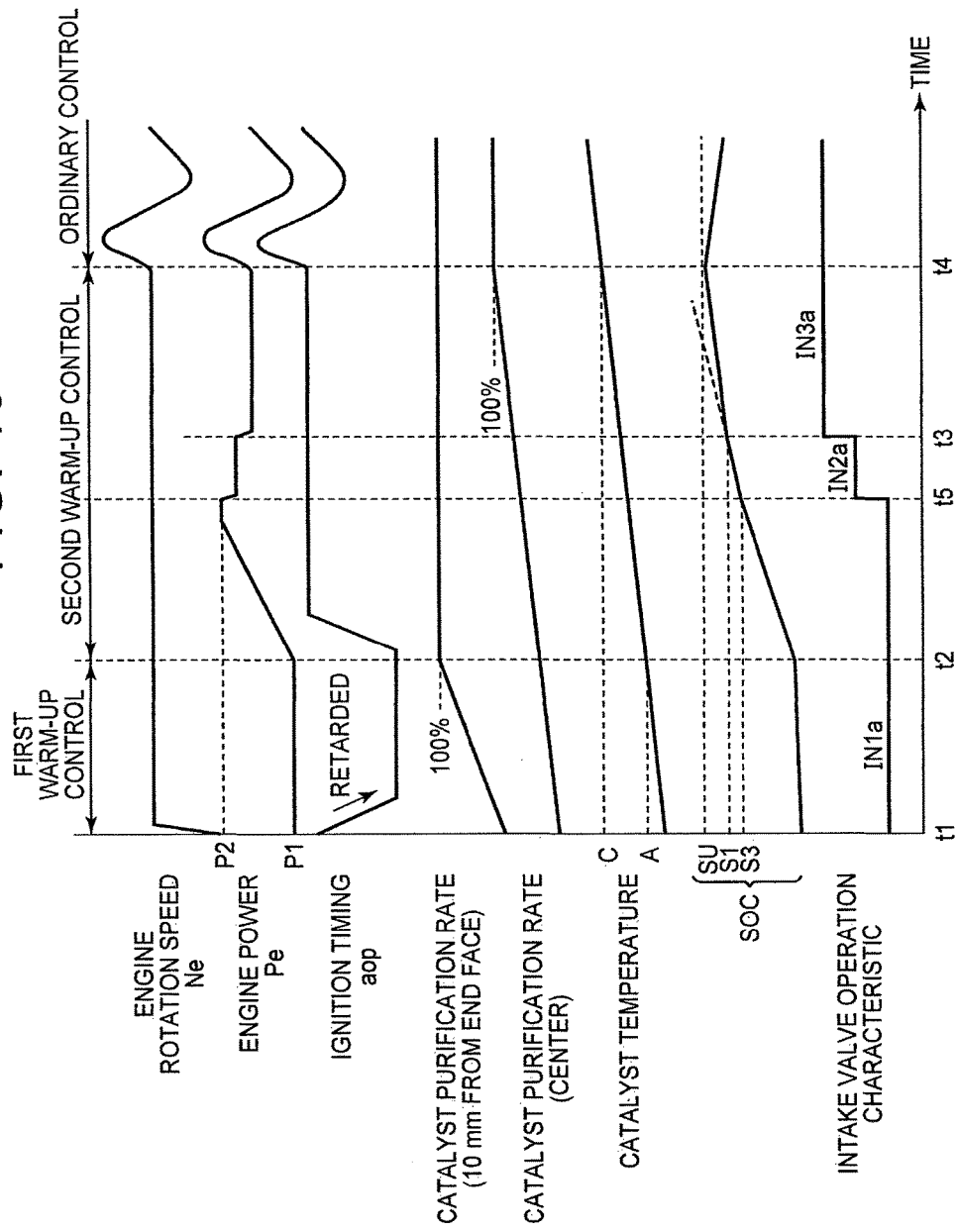
FIG. 16 is a waveform chart for illustrating a controlled state of the engine in catalyst warm-up control according to an alternative embodiment to the first embodiment.

FIG. 16 is a waveform chart for illustrating a controlled state of the engine 100 in catalyst warm-up control according to an alternative embodiment to the first embodiment. As shown in FIG. 16, when the end face purification rate of the S/C catalyst 112S reaches 100% at time t2, the catalyst warm-up control changes from the first warm-up control to the second warm-up control. In this alternative embodiment to the first embodiment, even when the second warm-up control is started, the operation characteristic of each intake valve 118 is kept at the small cam characteristic.

When the SOC of the electrical storage device 10 reaches the value S3 at time t5, the operation characteristic of each intake valve 118 is set to the intermediate cam characteristic (IN2a). Thus, the output of the engine 100 is suppressed, and the degree of increase in SOC is suppressed. The SOC further increases while the degree of increase in SOC is suppressed, and, when the SOC reaches the value S1 at time t3, the operation characteristic of each intake valve 118 is set to the large cam characteristic (IN3a). Thus, the output of the engine 100 is further suppressed, and the degree of increase in SOC is further suppressed (the SOC may start decreasing depending on the traveling condition.). As a result, it is possible to continue the second warm-up control.

Figure 17:
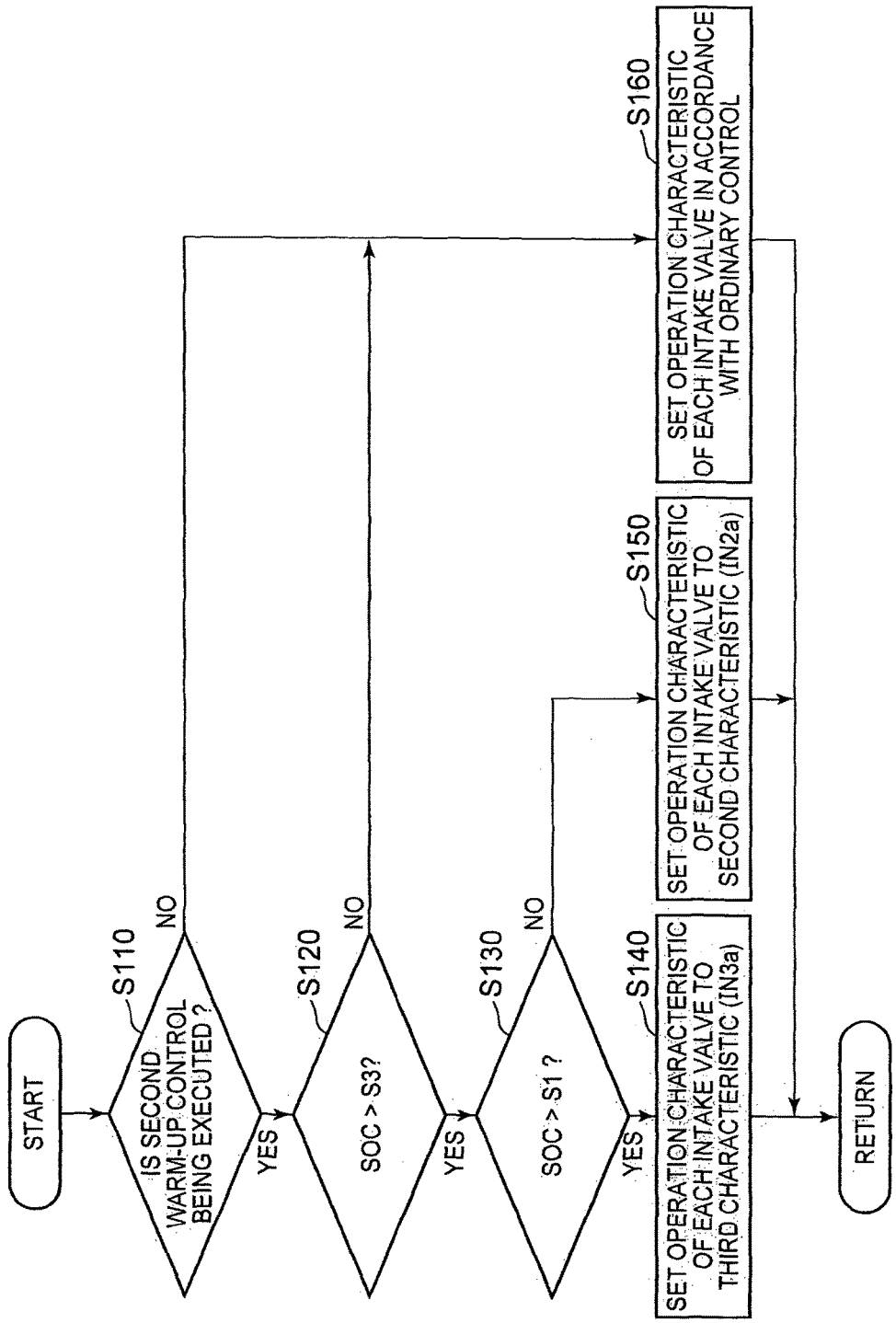
FIG. 17 is a flowchart that illustrates the process of setting the operation characteristic of each intake valve during execution of second warm-up control according to the alternative embodiment to the first embodiment.

FIG. 17 is a flowchart that illustrates the process of setting the operation characteristic of each intake valve 118 during execution of the second warm-up control according to the alternative embodiment to the first embodiment. As shown in FIG. 17, the controller 200 determines whether the second warm-up control is being executed (step S110). When it is determined that the second warm-up control is being executed (YES in step S110), the controller 200 determines whether the SOC of the electrical storage device 10 is higher than the value S3 (FIG. 15, FIG. 16) (step S120).

When it is determined that the SOC is higher than the value S3 (YES in step S120), the controller 200 determines whether the SOC is higher than the value S1 (FIG. 15, FIG. 16) (step S130). When it is determined that the SOC is higher than the value S1 (YES in step S130), the controller 200 controls the VVL device 400 so that the operation characteristic of each intake valve 118 is set to the third characteristic (IN3a), that is, the large cam characteristic, by the VVL device 400 (step S140). When it is determined in step S130 that the SOC is lower than or equal to the value S1 (NO in step S130), the controller 200 controls the VVL device 400 so that the operation characteristic of each intake valve 118 is set to the second characteristic (IN2a), that is, the intermediate cam characteristic (step S150). That is, when the SOC is higher than the value S3 but lower than the value S1, the operation characteristic of each intake valve 118 is set to the intermediate cam characteristic, and, when the SOC exceeds the value S1, the operation characteristic of each intake valve 118 is set to the large cam characteristic.

When it is determined in step S120 that the SOC is lower than or equal to the value S3 (NO in step S120) or when it is determined in step S110 that the second warm-up control is not being executed (NO in step S110), the operation characteristic of each intake valve 118 is set in accordance with the ordinary control as described with reference to, for example, FIG. 11 (step S160).

Although not specifically shown in the drawing, during execution of the second warm-up control, when the operation characteristic of each intake valve 118 is the intermediate cam characteristic in the case where the SOC becomes lower than the value S2, the operation characteristic of each intake valve 118 is changed to the small cam characteristic. During execution of the second warm-up control, when the operation characteristic of each intake valve 118 is the large cam characteristic in the case where the SOC is lower than the value S2, the operation characteristic of each intake valve 118 is changed to the intermediate cam characteristic or the small cam characteristic.

As described above, in the alternative embodiment to the first embodiment, when the SOC of the electrical storage device 10 increases during execution of the second warm-up control, the operation characteristic of each intake valve 118 is changed from the small cam characteristic to the intermediate cam characteristic and the large cam characteristic in a stepwise manner with an increase in SOC. Thus, according to the alternative embodiment to the first embodiment, it is possible to continue the second warm-up control while taking suppression of emissions into consideration.

A second embodiment will be described. In the first embodiment, the operation characteristic of each intake valve 118 is changed during execution of the second warm-up control on the basis of the SOC of the electrical storage device 10. In this second embodiment, the operation characteristic of each intake valve 118 is changed during execution of the second warm-up control on the basis of the charge power upper limit value Win and discharge power upper limit value Wout of the electrical storage device 10 instead of the SOC.

Figure 18:
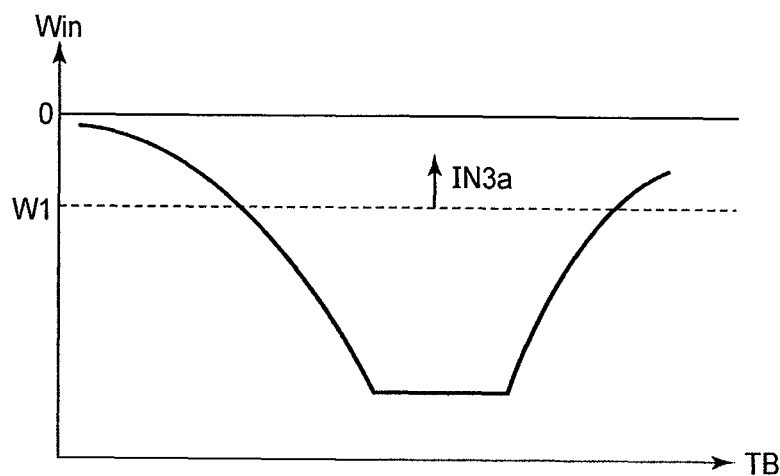
FIG. 18 is a graph that shows the correlation between a temperature of the electrical storage device and a charge power upper limit value Win.

FIG. 18 is a graph that shows the correlation between a temperature TB of the electrical storage device 10 and a charge power upper limit value Win. As described above, the charge power upper limit value Win is indicated by a negative value. As shown in FIG. 18, when the temperature of the electrical storage device 10 is high, the value of the charge power upper limit value Win increases (the absolute value of the charge power upper limit value Win decreases). Even when the temperature of the electrical storage device 10 is low, the value of the charge power upper limit value Win increases.

When charging of the electrical storage device 10 is limited as a result of a decrease in the absolute value of the charge power upper limit value Win, it can be not possible to continue the second warm-up control as described above. Therefore, in this second embodiment, when the charge power upper limit value Win exceeds a value W1 (negative value), the operation characteristic of each intake valve 118 is set to the large cam characteristic (IN3a). Thus, the output of the engine 100 is suppressed, and charging of the electrical storage device 10 can be suppressed to within the charge power upper limit value Win. As a result, it is possible to continue the second warm-up control.

Figure 19:
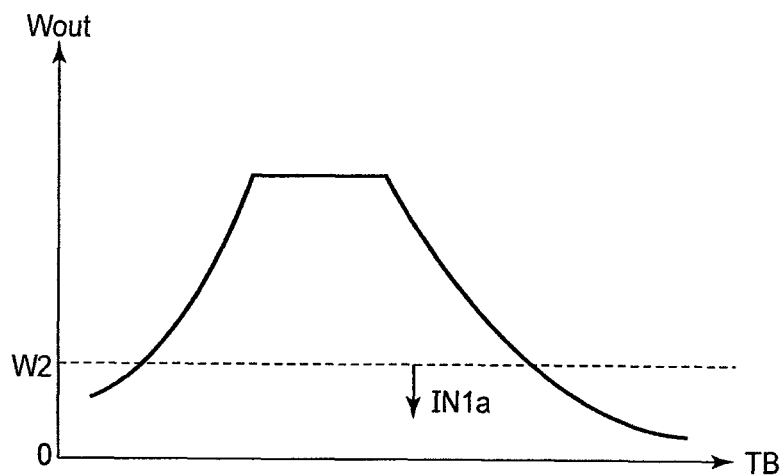
FIG. 19 is a graph that shows the correlation between a temperature of the electrical storage device and a discharge power upper limit value Wout.

FIG. 19 is a graph that shows the correlation between a temperature TB of the electrical storage device 10 and a discharge power upper limit value Wout. As shown in FIG. 19, when the temperature of the electrical storage device 10 is high, the discharge power upper limit value Wout decreases. When the temperature of the electrical storage device 10 is low as well, the discharge power upper limit value Wout decreases.

When discharging of the electrical storage device 10 is limited as a result of a decrease in the discharge power upper limit value Wout, it can be not possible to continue the second warm-up control as described above. Therefore, in this second embodiment, when the discharge power upper limit value Wout becomes lower than a value W2, the operation characteristic of each intake valve 118 is set to the small cam characteristic (IN1a). Thus, the output of the engine 100 increases, and the output of the electrical storage device 10 can be suppressed to within the discharge power upper limit value Wout. As a result, it is possible to continue the second warm-up control.

The overall configuration of the hybrid vehicle, the configuration of the engine 100 and the process of the catalyst warm-up control according to the second embodiment are the same as those of the above-described first embodiment.

Figure 20:
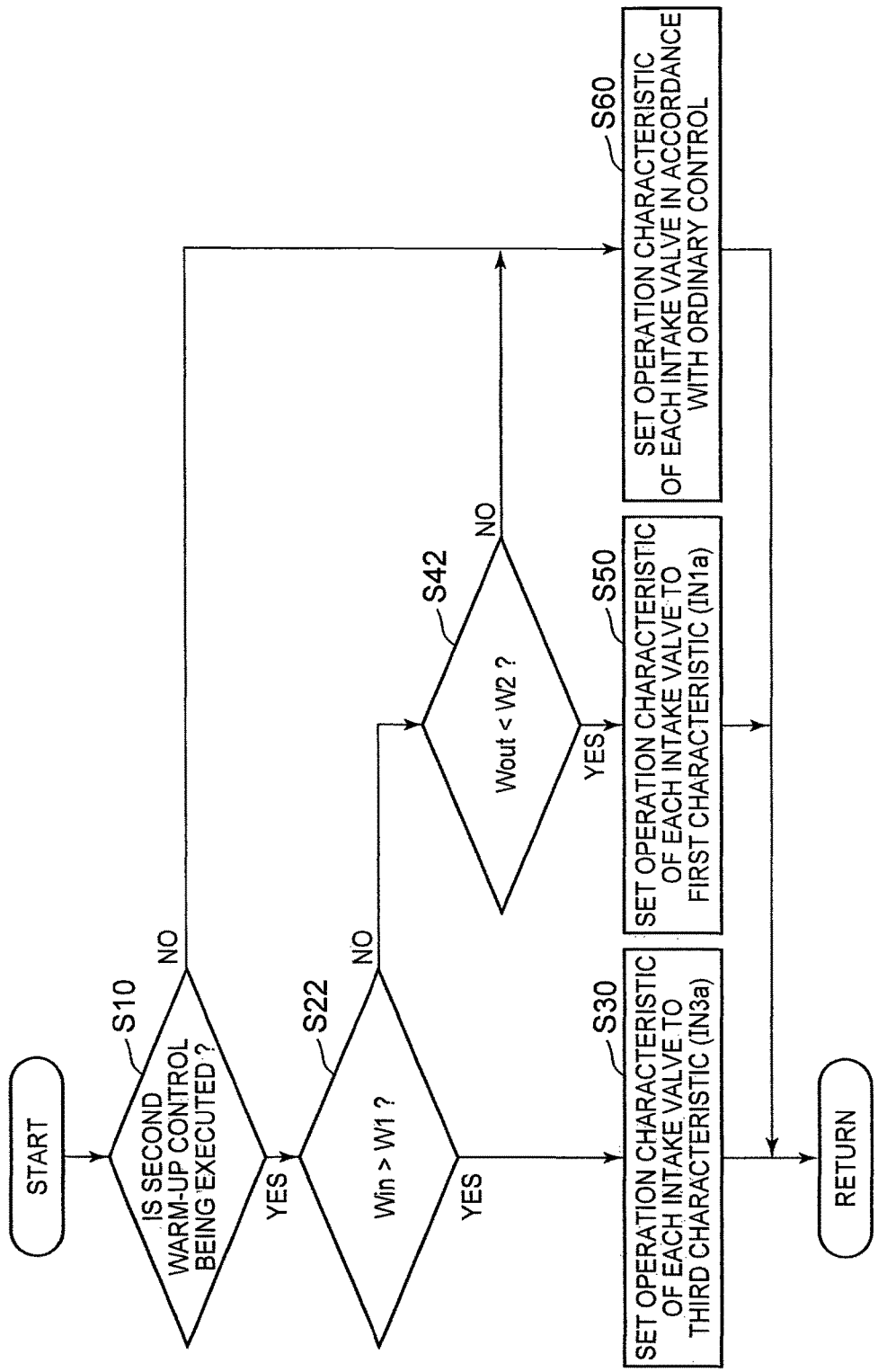
FIG. 20 is a flowchart that illustrates the process of setting the operation characteristic of each intake valve during execution of second warm-up control according to a second embodiment.

FIG. 20 is a flowchart that illustrates the process of setting the operation characteristic of each intake valve 118 during execution of the second warm-up control according to the second embodiment. As shown in FIG. 17, this flowchart differs from the flowchart shown in FIG. 14 in that step S22 and step S42 are included instead of step S20 and step S40.

That is, when it is determined in step S10 that the second warm-up control is being executed (YES in step S10), the controller 200 determines whether the charge power upper limit value Win is larger than the value W1 (FIG. 18) (step S22). When it is determined that the charge power upper limit value Win is larger than the value W1 (YES in step S22), the process proceeds to step S30. That is, the operation characteristic of each intake valve 118 is set to the third characteristic (IN3a), that is, the large cam characteristic, by the VVL device 400.

When it is determined in step S22 that the charge power upper limit value Win is smaller than or equal to the value W1 (NO in step S22), the controller 200 determines whether the discharge power upper limit value Wout is smaller than the value W2 (FIG. 19) (step S42). When it is determined that the discharge power upper limit value Wout is smaller than the value W2 (YES in step S42), the process proceeds to step S50. That is, the operation characteristic of each intake valve 118 is set to the first characteristic (IN1a), that is, the small cam characteristic. The processes of the other steps are as described in the first embodiment (FIG. 14).

As described above, in this second embodiment, during execution of the second warm-up control, when the value of the charge power upper limit value Win is large (when the absolute value of the charge power upper limit value Win is small), the VVL device 400 is controlled so as to increase the valve lift and valve operating angle of each intake valve 118. Thus, the output of the engine 100 is suppressed, and charging of the electrical storage device 10 can be suppressed to within the charge power upper limit value Win. On the other hand, when the discharge power upper limit value Wout is large, the VVL device 400 is controlled so as to reduce the valve lift and valve operating angle of each intake valve 118. Thus, the output of the engine 100 increases, and the output of the electrical storage device 10 can be suppressed to within the discharge power upper limit value Wout. Thus, it is possible to avoid a situation that the second warm-up control is stopped because of limitations on charging or discharging of the electrical storage device 10. Thus, according to the second embodiment as well, it is possible to continue the catalyst warm-up control without deterioration of fuel economy or emissions in exhaust gas.

As in the case of the alternative embodiment to the first embodiment, with the configuration that the operation characteristic of each intake valve 118 is kept at the small cam characteristic even when the second warm-up control is started, when the absolute value of the charge power upper limit value Win decreases during execution of the second warm-up control, the operation characteristic of each intake valve 118 may be changed from the small cam characteristic to the intermediate cam characteristic and the large cam characteristic in a stepwise manner with a decrease in the absolute value of the charge power upper limit value Win.

Figure 21:
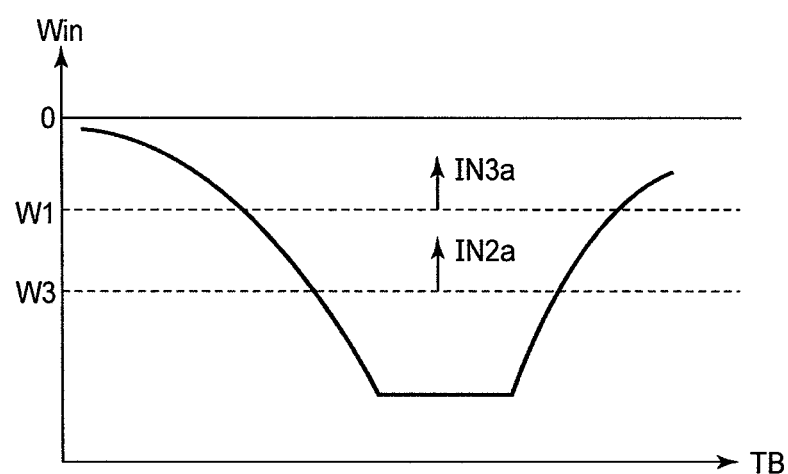
FIG. 21 is a graph that shows the correlation between a temperature of the electrical storage device and a charge power upper limit value Win.

FIG. 21 is a graph that shows the correlation between a temperature TB of the electrical storage device 10 and a charge power upper limit value Win. As shown in FIG. 21, when the charge power upper limit value Win exceeds a value W3 (negative value) as a result of an increase or decrease in the temperature TB of the electrical storage device 10, the operation characteristic of each intake valve 118 is set to the intermediate cam characteristic (IN2a).

When the charge power upper limit value Win exceeds the value W1 (negative value) (W1>W3) as a result of a further increase or decrease in the temperature TB of the electrical storage device 10, the operation characteristic of each intake valve 118 is set to the large cam characteristic (IN3a).

Figure 22:
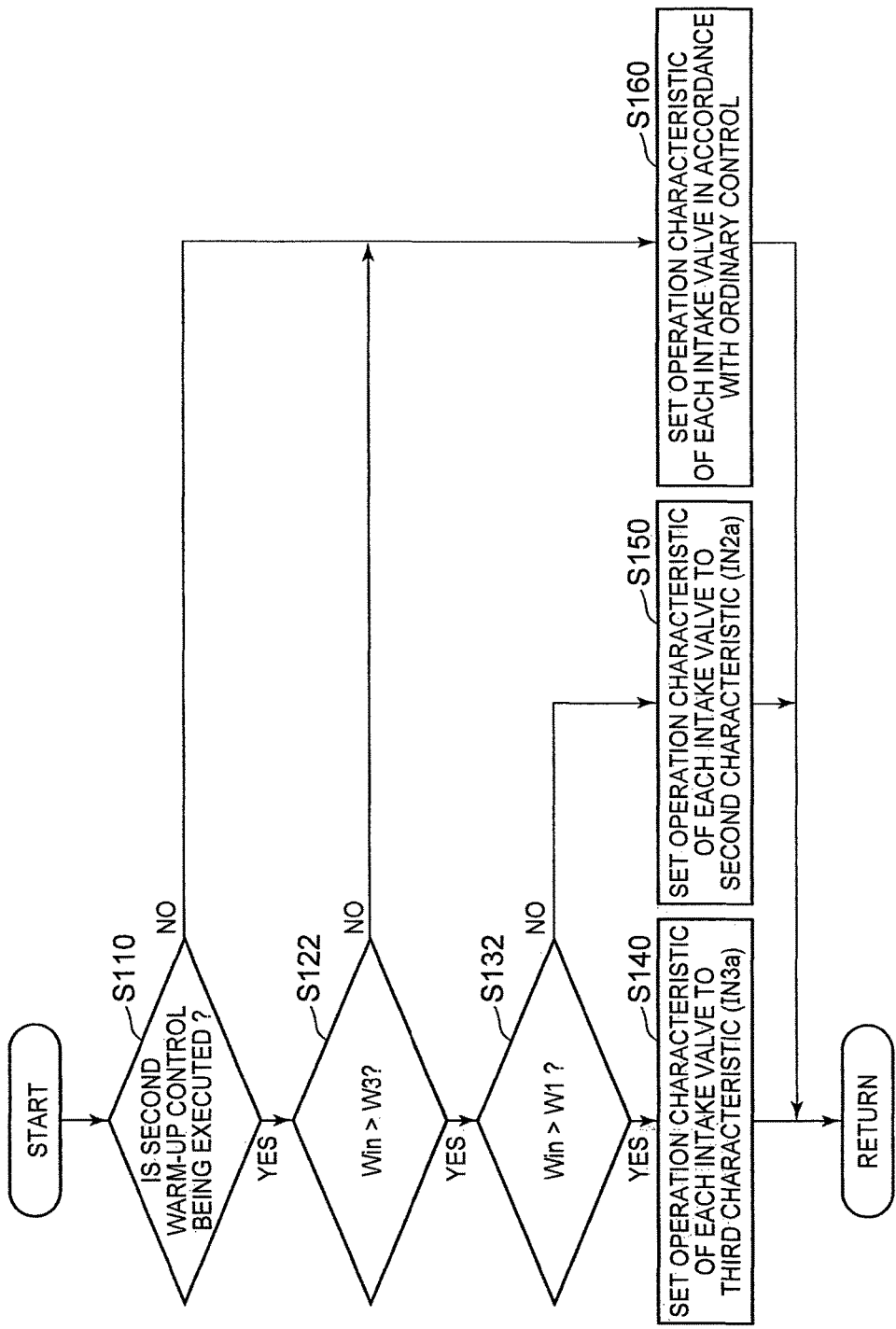
FIG. 22 is a flowchart that illustrates the process of setting the operation characteristic of each intake valve during execution of second warm-up control according to an alternative embodiment to the second embodiment.

FIG. 22 is a flowchart that illustrates the process of setting the operation characteristic of each intake valve 118 during execution of the second warm-up control according to the alternative embodiment to the second embodiment. As shown in FIG. 22, this flowchart differs from the flowchart shown in FIG. 17 in that step S122 and step S132 are included instead of step S120 and step S130.

That is, when it is determined in step S110 that the second warm-up control is being executed (YES in step S110), the controller 200 determines whether the charge power upper limit value Win is larger than the value W3 (FIG. 21) (step S122). When it is determined that the charge power upper limit value Win is larger than the value W3 (YES in step S122), the controller 200 further determines whether the charge power upper limit value Win is larger than the value W1 (FIG. 21) (step S132).

When it is determined that the charge power upper limit value Win is larger than the value W1 (YES in step S132), the process proceeds to step S140. That is, the operation characteristic of each intake valve 118 is set to the third characteristic (IN3a), that is, the large cam characteristic, by the VVL device 400. When it is determined in step S132 that the charge power upper limit value Win is smaller than or equal to the value W1 (NO in step S132), the process proceeds to step S150. That is, the operation characteristic of each intake valve 118 is set to the second characteristic (IN2a), that is, the intermediate cam characteristic. That is, when the charge power upper limit value Win is larger than the value W3 and smaller than the value W1, the operation characteristic of each intake valve 118 is set to the intermediate cam characteristic, and, when the charge power upper limit value Win exceeds the value W1, the operation characteristic of each intake valve 118 is set to the large cam characteristic.

When it is determined in step S122 that the charge power upper limit value Win is smaller than or equal to the value W3 (NO in step S122), the process proceeds to step S160, and the operation characteristic of each intake valve 118 is set in accordance with the ordinary control as described with reference to, for example, FIG. 11.

Although not specifically shown in the drawing, during execution of the second warm-up control, when the operation characteristic of each intake valve 118 is the intermediate cam characteristic in the case where the discharge power upper limit value Wout becomes smaller than the value W2, the operation characteristic of each intake valve 118 may be changed to the small cam characteristic. During execution of the second warm-up control, when the operation characteristic of each intake valve 118 is the large cam characteristic in the case where the discharge power upper limit value Wout becomes smaller than the value W2, the operation characteristic of each intake valve 118 may be changed to the intermediate cam characteristic or the small cam characteristic.

As described above, in the alternative embodiment to the second embodiment, when the absolute value of the charge power upper limit value Win decreases during execution of the second warm-up control, the operation characteristic of each intake valve 118 is changed from the small cam characteristic to the intermediate cam characteristic and the large cam characteristic in a stepwise manner with the decrease. Thus, according to the alternative embodiment to the second embodiment, it is possible to continue the second warm-up control while taking suppression of emissions into consideration.

A third embodiment will be described. In the above-described first embodiment, the VVL device 400 is able to change the operation characteristic of each intake valve 118 in three steps. In this third embodiment, the operation characteristic of each intake valve 118 is changeable in two steps.

Figure 23:
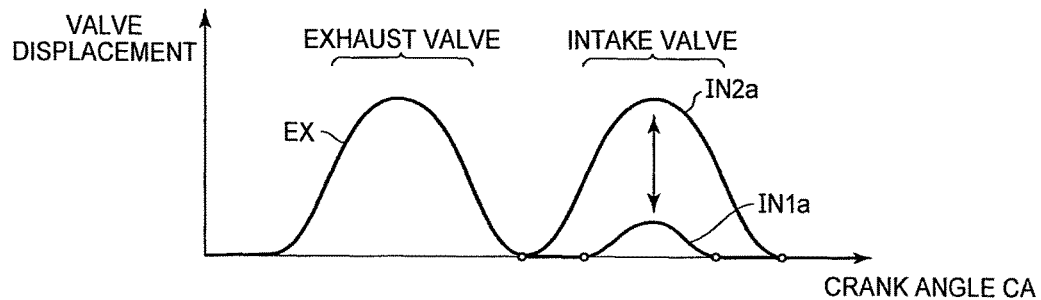
FIG. 23 is a graph that shows the correlation between a crank angle and a valve displacement that is achieved by a VVL device that is able to change the operation characteristic of each intake valve in two steps.

FIG. 23 is a graph that shows the correlation between a crank angle and a valve displacement that is achieved by a VVL device 400A that is able to change the operation characteristic of each intake valve 118 in two steps. As shown in FIG. 23, the VVL device 400A is able to change the operation characteristic of each intake valve 118 to one of the first characteristic (small cam characteristic) indicated by the waveform IN1*a* and the second characteristic (large cam characteristic) indicated by the waveform IN2*a*.

Figure 24:
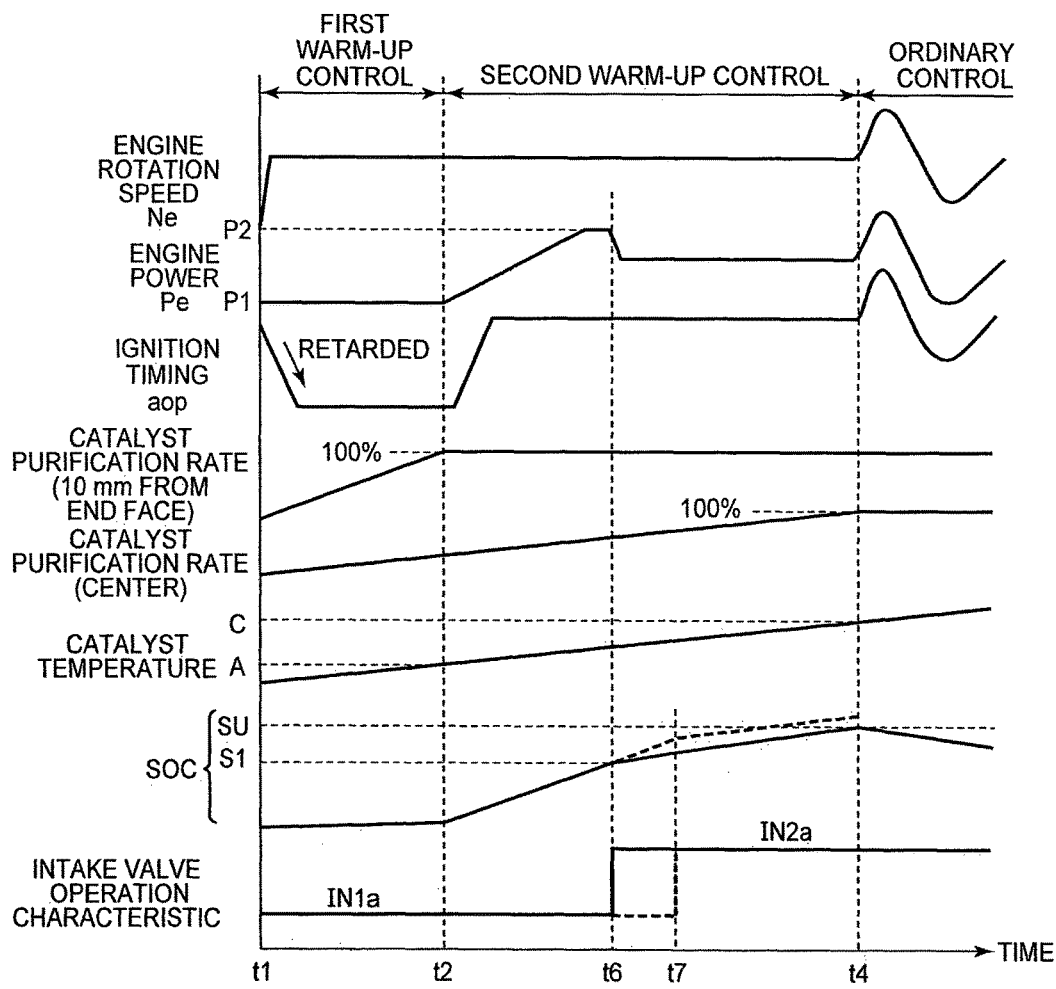
FIG. 24 is a waveform chart for illustrating a controlled state of the engine during catalyst warm-up control according to a third embodiment.

FIG. 24 is a waveform chart for illustrating a controlled state of the engine 100 during catalyst warm-up control according to the third embodiment. FIG. 24 corresponds to FIG. 10. As shown in FIG. 24, in the third embodiment in which the operation characteristic of each intake valve 118 is changeable in two steps, even when the second warm-up control is started at time t2, the operation characteristic of each intake valve 118 is kept at the small cam characteristic.

When the SOC of the electrical storage device 10 reaches the value S1 at time t6, the operation characteristic of each intake valve 118 is changed from the small cam characteristic to the large cam characteristic. Thus, the output of the engine 100 is suppressed because of decompression, and the degree of increase in SOC is suppressed. As a result, it is possible to continue the second warm-up control.

In the case where the SOC of the electrical storage device 10 has not reached the value S1, when the combustion state of the engine 100 becomes stable at time t7, the operation characteristic of each intake valve 118 is changed from the small cam characteristic to the large cam characteristic. Until the combustion state becomes stable, suppression of emissions is given a higher priority than improvement in fuel economy, and the operation characteristic of each intake valve 118 is set to the small cam characteristic. When the combustion state becomes stable, the operation characteristic of each intake valve 118 is changed to the large cam characteristic. In the case where the SOC of the electrical storage device 10 is increasing, when the operation characteristic of each intake valve 118 is changed to the large cam characteristic in wait for time t7, the SOC exceeds the upper limit value SU as indicated by the dashed line. Therefore, in this third embodiment, when the SOC reaches the value S1 at time t6, the operation characteristic of each intake valve 118 is changed to the large cam characteristic not in wait for time t7.

As for the combustion state of the engine 100, for example, when the combustion temperature of the engine 100 exceeds a predetermined temperature, it may be determined that the combustion state becomes stable. The combustion temperature is estimated on the basis of an engine coolant temperature, an oil temperature, an accumulated amount of air, and the like, by using a prepared map, relational expression, or the like.

Figure 25:
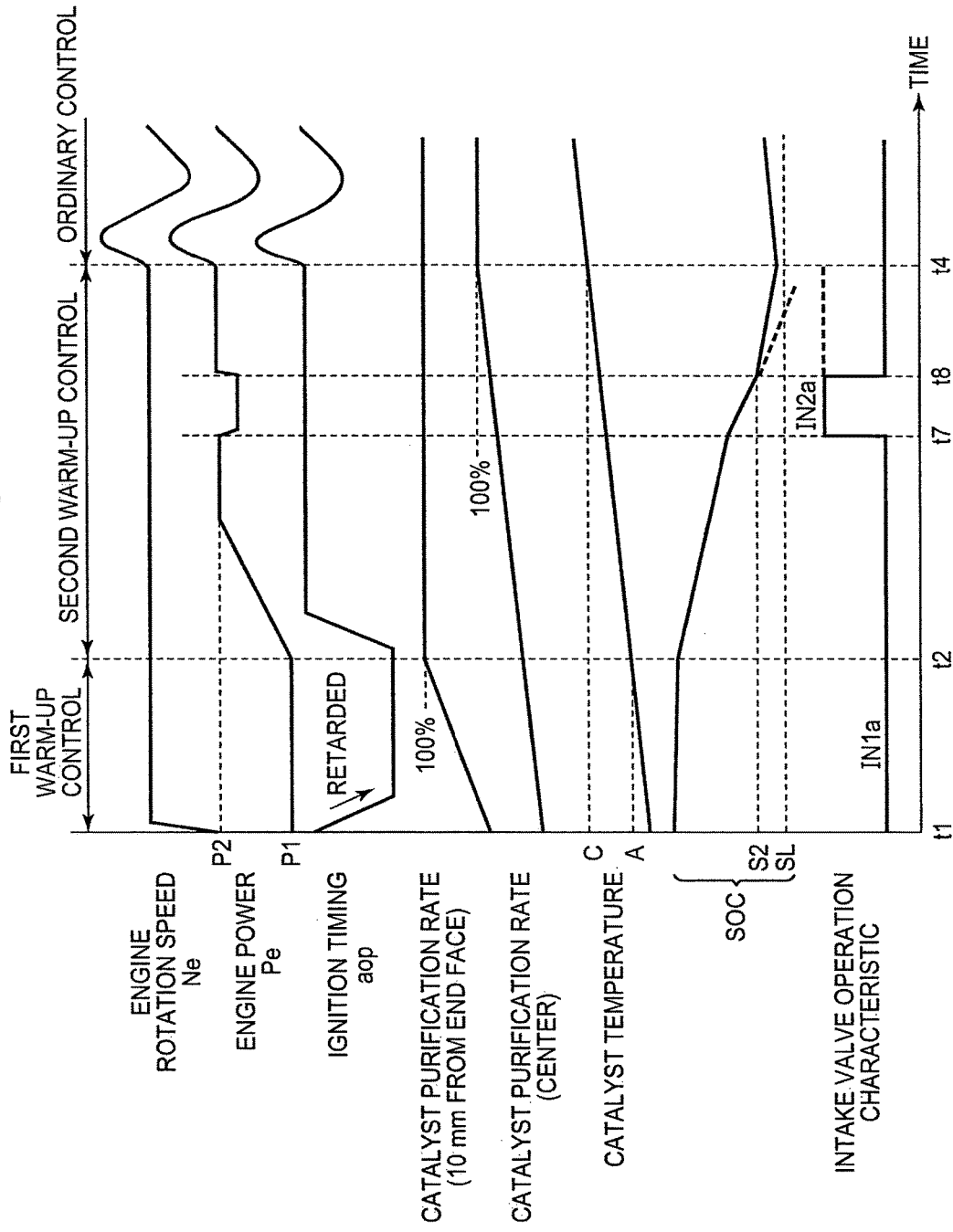
FIG. 25 is another waveform chart for illustrating a controlled state of the engine during catalyst warm-up control according to the third embodiment.

FIG. 25 is another waveform chart for illustrating a controlled state of the engine 100 in catalyst warm-up control according to the third embodiment. FIG. 25 shows the case where the traveling power of the hybrid vehicle 1 is large and the SOC decreases during execution of the second warm-up control, and corresponds to FIG. 12.

As shown in FIG. 25, during execution of the second warm-up control, the combustion state of the engine 100 becomes stable at time t7, with the result that the operation characteristic of each intake valve 118 is changed from the small cam characteristic (IN1*a*) to the large cam characteristic (IN2*a*). After that, when the SOC of the electrical storage device 10 decreases to the value S2 at time t8, the operation characteristic of each intake valve 118 is changed from the large cam characteristic to the small cam characteristic (IN1*a*). Thus, the output of the engine 100 increases, and the degree of decrease in SOC is suppressed. As a result, it is possible to continue the second warm-up control.

Figure 26:
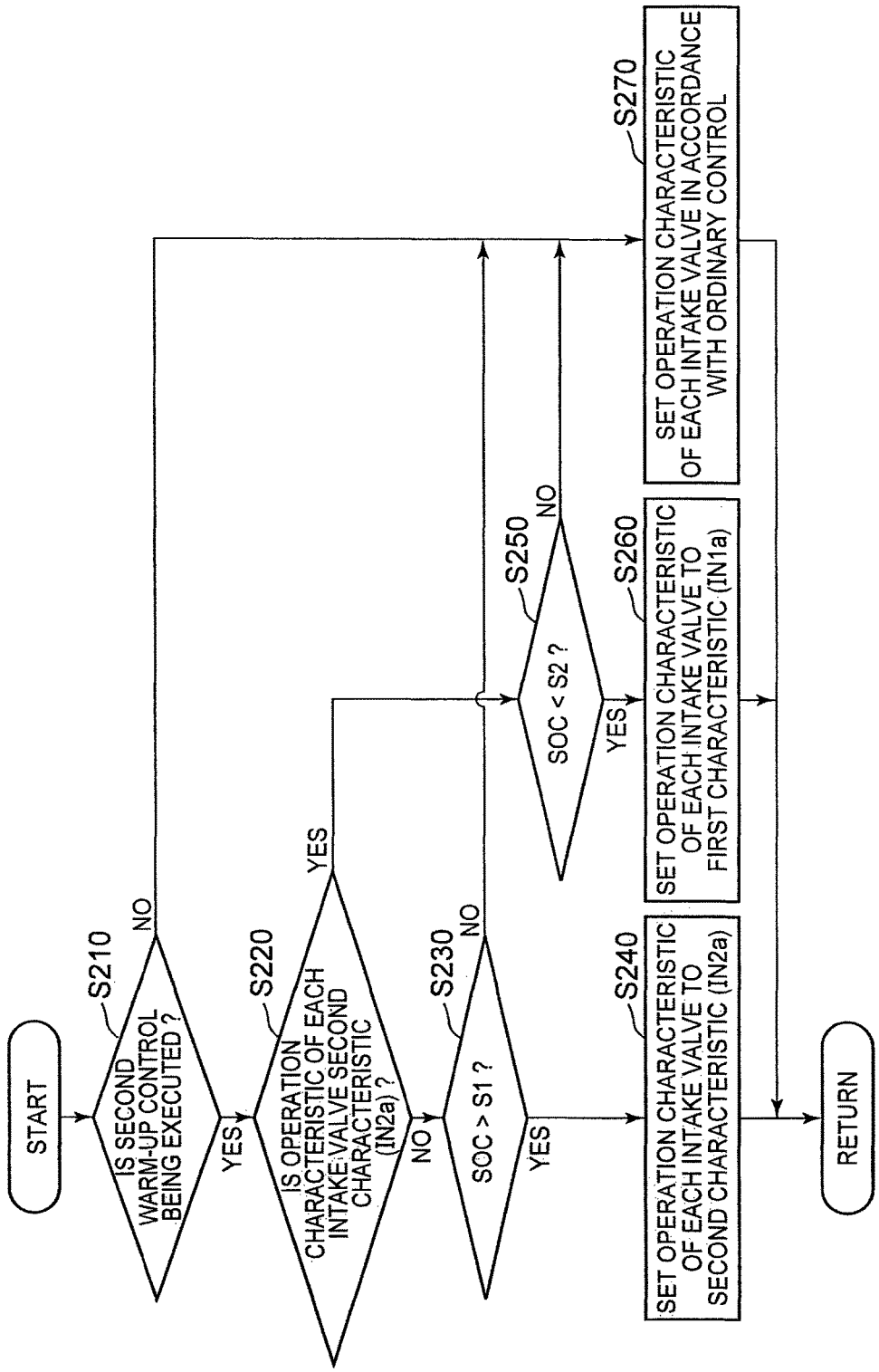
FIG. 26 is a flowchart that illustrates the process of setting the operation characteristic of each intake valve during execution of second warm-up control according to the third embodiment.

FIG. 26 is a flowchart that illustrates the process of setting the operation characteristic of each intake valve 118 during execution of the second warm-up control according to the third embodiment. As shown in FIG. 26, the controller 200 determines whether the second warm-up control is being executed (step S210). When it is determined that the second warm-up control is being executed (YES in step S210), the controller 200 determines whether the operation characteristic of each intake valve 118 is set to the second characteristic (IN2*a*), that is, the large cam characteristic, by the VVL device 400A (step S220). This determination process is to determine on the basis of the combustion state of the engine 100 whether the operation characteristic of each intake valve 118 has been already changed to the second characteristic (large cam characteristic).

When it is determined in step S220 that the operation characteristic of each intake valve 118 is not the second characteristic (large cam characteristic), that is, the first characteristic (small cam characteristic) (NO in step S220), the controller 200 determines whether the SOC of the electrical storage device 10 is higher than the value S1 (step S230). When it is determined that the SOC is higher than the value S1 (YES in step S230), the controller 200 controls the VVL device 400A so that the operation characteristic of each intake valve 118 is set to the second characteristic (IN2*a*), that is, the large cam characteristic (step S240). When it is determined in step S230 that the SOC is lower than or equal to the value S1 (NO in step S230), the operation characteristic of each intake valve 118 is set in accordance with the ordinary control as described with reference to FIG. 11 (step S270).

On the other hand, when it is determined in step S220 that the operation characteristic of each intake valve 118 is the second characteristic (large cam characteristic) (YES in step S220), the controller 200 determines whether the SOC is lower than the value S2 (step S250). When it is determined that the SOC is lower than the value S2 (YES in step S250), the controller 200 controls the VVL device 400A so that the operation characteristic of each intake valve 118 is set to the first characteristic (IN1*a*), that is, the small cam characteristic (step S260). When it is determined in step S250 that the SOC is higher than or equal to the value S2 (NO in step S250), the process proceeds to step S270.

Although not specifically shown in the drawing, in this third embodiment in which the operation characteristic of each intake valve 118 is changeable in two steps as well, as in the case of the second embodiment, the operation characteristic of each intake valve 118 may be changed during execution of the second warm-up control on the basis of the charge power upper limit value Win and discharge power upper limit value Wout of the electrical storage device 10 instead of the SOC. Specifically, when the charge power upper limit value Win exceeds the value W1 (negative value), the operation characteristic of each intake valve 118 may be changed from the small cam characteristic to the large cam characteristic, and, when the discharge power upper limit value Wout becomes smaller than the value W2, the operation characteristic of each intake valve 118 may be changed from the large cam characteristic to the small cam characteristic.

In this third embodiment as well, similar advantageous effects to those of the above-described first and second embodiments are obtained. According to this third embodiment, because the operation characteristic of each intake valve 118 is changeable in two steps, it is possible to reduce a time that is required to adapt control parameters for controlling the operating state of the engine 100. In addition, it is possible to reduce torque that is required of the actuator for changing the operation characteristic of each intake valve 118, so it is possible to reduce the size and weight of the actuator. The manufacturing cost of the actuator can also be reduced.

A fourth embodiment will be described. In the above-described first embodiment, when the SOC of the electrical storage device 10 reaches the predetermined value, the operation characteristic of each intake valve 118 is changed in order to continue the second warm-up control. In this fourth embodiment, a remaining execution time of the second warm-up control is estimated, and the timing of a change of the operation characteristic of each intake valve 118 is determined on the basis of the remaining execution time of the second warm-up control so that the SOC of the electrical storage device 10 does not exceed the upper limit value SU or become lower than the lower limit value SL.

Figure 27:
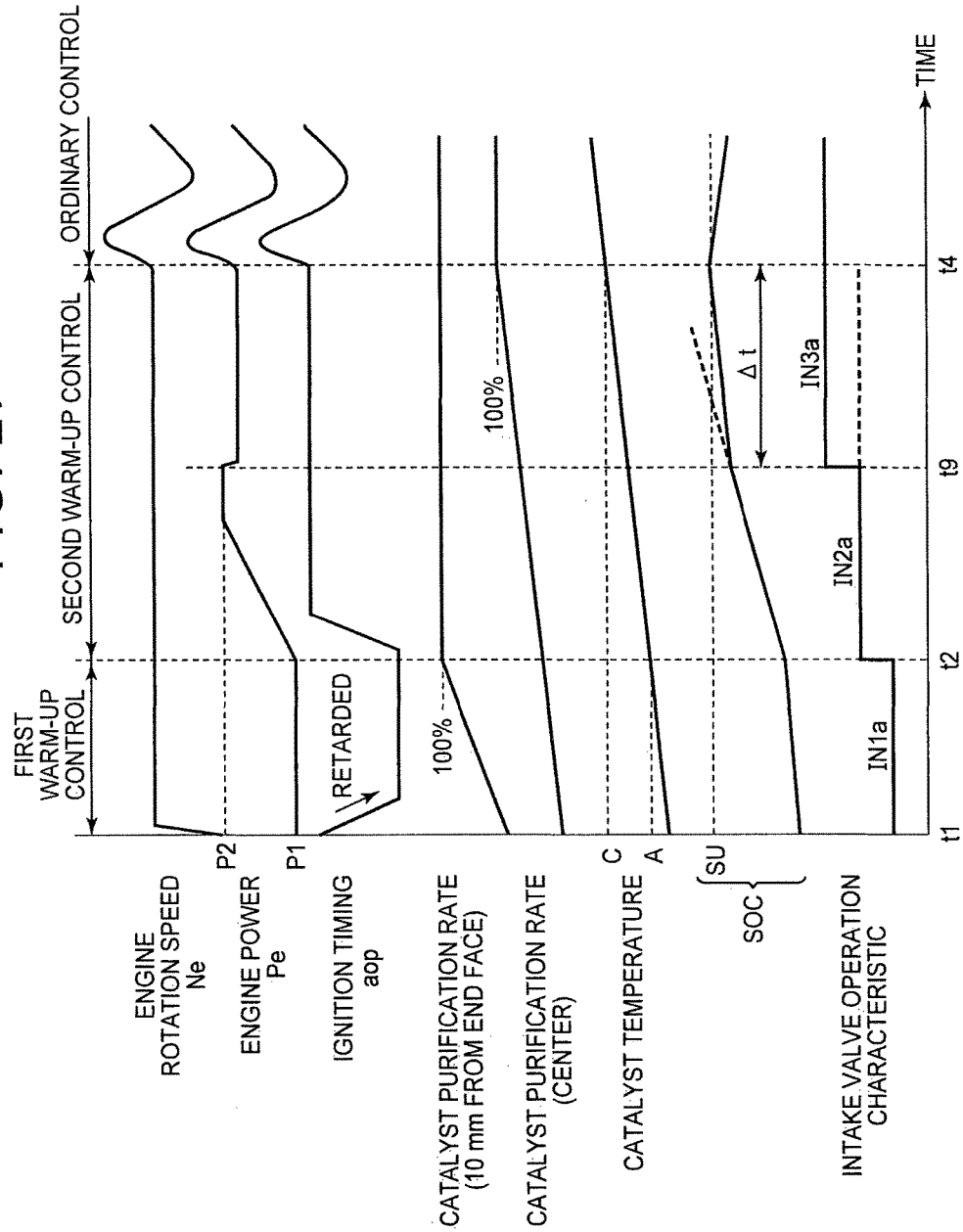
FIG. 27 is a waveform chart for illustrating a controlled state of the engine during catalyst warm-up control according to a fourth embodiment.

FIG. 27 is a waveform chart for illustrating a controlled state of the engine 100 during catalyst warm-up control according to the fourth embodiment. As shown in FIG. 27, during execution of the second warm-up control, a remaining execution time $\Delta t$ (hereinafter, also simply referred to as "remaining time $\Delta t$") of the second warm-up control is estimated. The timing (time t9) of a change of the operation characteristic of each intake valve 118 to the large cam characteristic (IN3a) is determined on the basis of the remaining time $\Delta t$ so that the SOC does not exceed the upper limit value SU.

As an example, the remaining time $\Delta t$ is momentarily estimated during execution of the second warm-up control, and the operation characteristic of each intake valve 118 is changed to the large cam characteristic (IN3a) at the timing (time t9) at which the SOC after a lapse of the remaining time $\Delta t$ reaches the upper limit value SU in the case where the operation characteristic of each intake valve 118 is the large cam characteristic (IN3a).

The overall configuration of the hybrid vehicle, the configuration of the engine 100 and the process of the catalyst warm-up control according to the fourth embodiment are the same as those of the above-described first embodiment.

Figure 28:
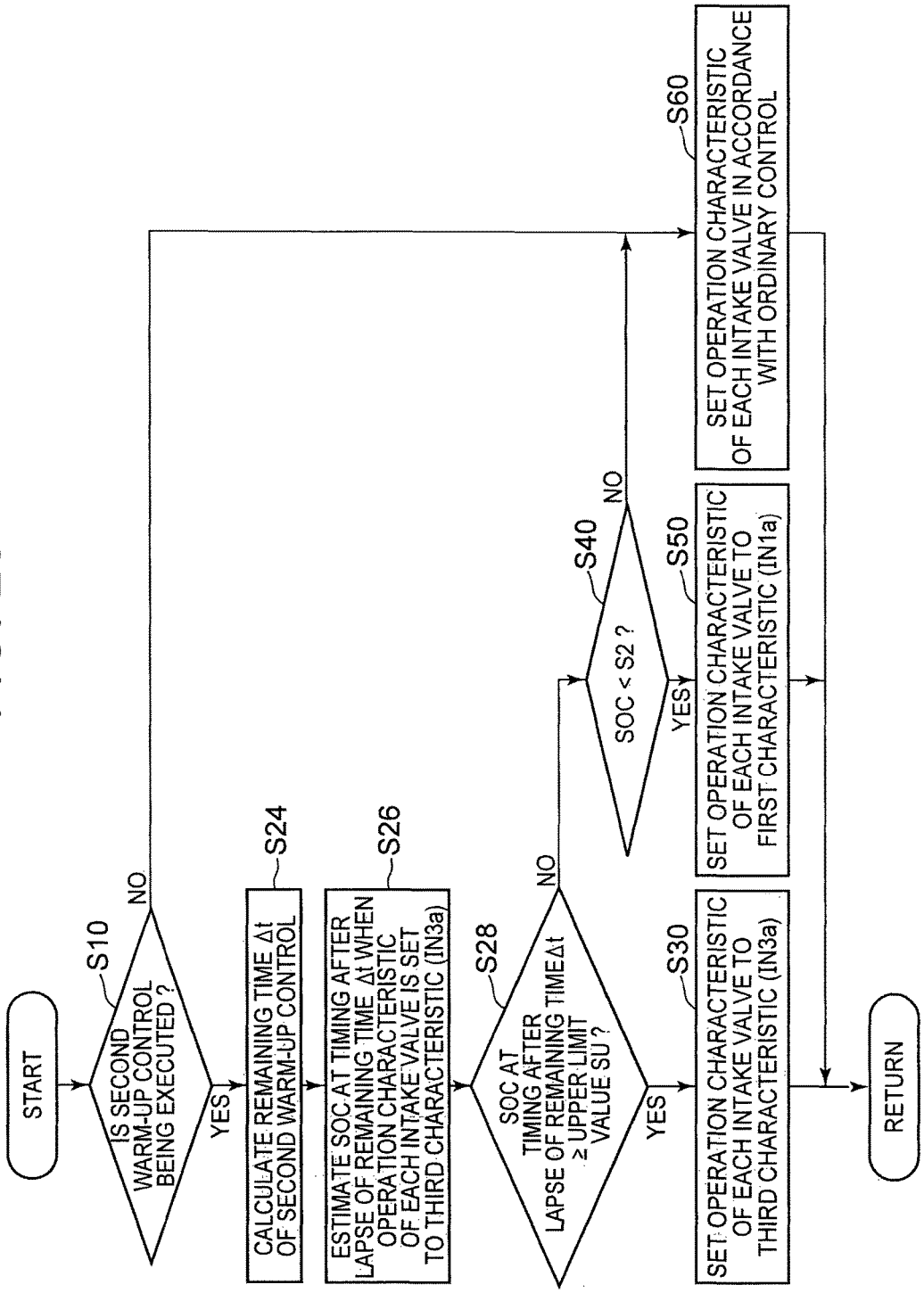
FIG. 28 is a flowchart that illustrates the process of setting the operation characteristic of each intake valve during execution of second warm-up control according to the fourth embodiment.

FIG. 28 is a flowchart that illustrates the process of setting the operation characteristic of each intake valve 118 during execution of the second warm-up control according to the fourth embodiment. FIG. 28 corresponds to the flowchart of FIG. 14 according to the first embodiment.

As shown in FIG. 28, this flowchart differs from the flowchart shown in FIG. 14 in that step S24, step S26 and step S28 are included instead of step S20. That is, when it is determined in step S10 that the second warm-up control is being executed (YES in step S10), the controller 200 calculates the remaining time $\Delta t$ of the second warm-up control (step S24). The remaining time $\Delta t$ may be, for example, estimated from a catalyst temperature. As described above, the catalyst temperature is estimated from the intake air amount and ignition retardation amount of the engine 100 by using a prepared map, relational expression, or the like. When an execution time of the second warm-up control is determined in advance, the remaining time $\Delta t$ may be calculated on the basis of a time elapsed from when the second warm-up control is started.

Subsequently, when the controller 200 sets the operation characteristic of each intake valve 118 to the second characteristic (IN2a), that is, the large cam characteristic, the controller 200 estimates the SOC of the electrical storage device 10 at the timing after a lapse of the remaining time $\Delta t$ (step S26). The SOC changes depending on the traveling condition; however, the SOC is calculated on the assumption that no electric power is consumed through traveling in the EV mode (traveling by using the motor generator MG2) during the second warm-up control as the most strict condition that an increase in SOC is the largest. It is possible to calculate electric power generated by the motor generator MG1 and electric power with which the electrical storage device 10 is charged on the basis of the output of the engine 100 (the operation characteristic of each intake valve 118 is the large cam characteristic), so the SOC at the timing after a lapse of the remaining time $\Delta t$ is calculated on the basis of the charging electric power.

Subsequently, the controller 200 determines whether the SOC at the timing after a lapse of the remaining time $\Delta t$ is higher than or equal to the upper limit value SU (FIG. 27) (step S28). When it is determined that the SOC at the timing after a lapse of the remaining time $\Delta t$ is higher than or equal to the upper limit value SU (YES in step S28), the process proceeds to step S30. That is, the operation characteristic of each intake valve 118 is set to the third characteristic (IN3a), that is, the large cam characteristic, by the VVL device 400.

On the other hand, when it is determined in step S28 that the SOC at the timing after a lapse of the remaining time $\Delta t$ is lower than the upper limit value SU (NO in step S28), the process proceeds to step S40, and it is determined whether the current SOC is lower than the value S2. The process from step S40 is as described with reference to FIG. 14.

In the above description, when the operation characteristic of each intake valve 118 is the small cam characteristic before the operation characteristic is set to the large cam characteristic, the operation characteristic may be changed from the small cam characteristic to the intermediate cam characteristic before the operation characteristic is set to the large cam characteristic, and then the operation characteristic may be changed to the large cam characteristic. For example, when the operation characteristic of each intake valve 118 is the small cam characteristic, the SOC of the electrical storage device 10 at the timing after a lapse of the remaining time $\Delta t$ may be estimated, and the operation characteristic may be changed from the small cam characteristic to the intermediate cam characteristic at the timing at which the estimated SOC reaches the upper limit value SU.

Although not specifically shown in the drawing, when the operation characteristic of each intake valve 118 is changed to the small cam characteristic at the time of a decrease in SOC as well, the SOC at the timing after a lapse of the remaining time $\Delta t$ may be estimated, and the operation characteristic may be changed to the small cam characteristic at the timing at which the estimated SOC reaches the lower limit value SL, as well as the above-described method. The operation characteristic of each intake valve 118 may be changeable in two steps as described in the third embodiment.

As described above, according to the fourth embodiment, the timing of a change of the operation characteristic of each intake valve 118 is determined on the basis of the remaining time Δt of the second warm-up control, so it is possible to reliably execute the second warm-up control to the end.

In the above-described embodiments, the exhaust emission control device is formed of the upstream S/C catalyst 112S and the downstream U/F catalyst 112U (FIG. 2), and, for the S/C catalyst 112S, when the end face purification rate of the S/C catalyst 112S reaches 100%, the catalyst warm-up control shifts from the first warm-up control to the second warm-up control, and, when the center purification rate of the S/C catalyst 112S reaches 100%, the control mode changes from the catalyst warm-up control (second warm-up control) to the ordinary control.

Instead of such a configuration, when the purification rate (center purification rate) of the upstream S/C catalyst 112S reaches 100%, the catalyst warm-up control may shift from the first warm-up control to the second warm-up control, and, when the purification rate (center purification rate) of the downstream U/F catalyst 112U reaches 100%, the control mode may change from the catalyst warm-up control (second warm-up control) to the ordinary control.

Alternatively, the exhaust emission control device may be formed of a single catalyst without being separated into the S/C catalyst 112S and the U/F catalyst 112U, the catalyst warm-up control may shift from the first warm-up control to the second warm-up control when the end face purification rate of the catalyst reaches 100%, and the control mode may change from the catalyst warm-up control (second warm-up control) to the ordinary control when the center purification rate of the catalyst reaches 100%.

Although not specifically shown in the drawing, the operation characteristic of each intake valve 118 may be changeable continuously (steplessly), and, for example, the operation characteristic of each intake valve 118 during the second warm-up control may be continuously changed from the small cam characteristic to the large cam characteristic.

In the above description, the valve operating angle of each intake valve 118 is changed together with the valve lift of each intake valve 118. However, the invention is also applicable to a hybrid vehicle including an engine that includes a variable valve actuating device that is able to change one of the valve lift of each intake valve 118 and the valve operating angle of each intake valve 118. With the variable valve actuating device that is able to change one of the valve lift and valve operating angle of each intake valve 118 as well, it is possible to obtain similar advantageous effects to those of the case where it is possible to change both the valve lift and valve operating angle of each intake valve 118. The variable valve actuating device that is able to change one of the valve lift and valve operating angle of each intake valve 118 may be implemented by utilizing various known techniques.

In the above-described embodiments, the controller 200 controls the power of the engine 100 for the output of the engine 100 (controls the power to the first or second operating power). Instead, the controller 200 may control the torque of the engine 100 (torque demand control). That is, the controller 200 may operate the engine 100 in the first warm-up control such that the engine 100 outputs a first torque, and may operate the engine 100 in the second warm-up control such that the engine 100 outputs a second torque (second torque>first torque). In this case, in the first warm-up control, the first operating point is set such that the torque of the engine 100 becomes the first torque, and, in the second warm-up control, the second operating point is set such that the torque of the engine 100 becomes the second torque.

In the above description, the series-parallel hybrid vehicle that is able to transmit the power of the engine 100 by distributing the power of the engine 100 to the drive wheels 6 and the motor generators MG1, MG2 by the power split device 4. The invention is also applicable to a hybrid vehicle of another type. That is, the invention is also applicable to, for example, a so-called series hybrid vehicle in which the engine 100 is only used to drive the motor generator MG1 and the driving force of the vehicle is generated by only the motor generator MG2, a hybrid vehicle in which only regenerative energy within kinetic energy generated by the engine 100 is recovered as electric energy, a motor-assist hybrid vehicle in which the engine is used as a main power source and a motor, where necessary, assists, or the like. The invention is also applicable to a hybrid vehicle that travels only by using the power of the engine while the motor is separated.

In the above description, the motor generator MG2 is one example of an "electric motor" according to the invention, and the engine 100 corresponds to one example of an "internal combustion engine" according to the invention. The VVL devices 400, 400A correspond to one example of a "variable valve actuating device" according to the invention.

The embodiments described above are expected to be implemented in appropriate combinations. The embodiments described above should be regarded as only illustrative in every respect and not restrictive. The scope of the invention is defined by the appended claims rather than the description of the above embodiments. The scope of the invention is intended to encompass all modifications within the scope of the appended claims and equivalents thereof.

The invention claimed is:

1. A hybrid vehicle comprising:
    an internal combustion engine including a variable valve actuating device, the variable valve actuating device being configured to change an operation characteristic of an intake valve;
    an electrical storage device configured to store electric power, the electric power being generated by using the internal combustion engine;
    an electric motor configured to generate a driving force of the hybrid vehicle by using the electric power;
    an exhaust emission control device configured to purify exhaust gas from the internal combustion engine with the use of a catalyst; and
    a controller configured to
        execute catalyst warm-up control, the catalyst warm-up control being control for warming up the catalyst, the catalyst warm-up control including first control and second control, the first control being control for operating the internal combustion engine at a first operating point, the second control being control for, after the first control is executed, operating the internal combustion engine at a second operating point irrespective of a driving force that is required to propel the hybrid vehicle, an output of the internal combustion engine at the second operating point being larger than an output of the internal combustion engine at the first operating point,
        operate the internal combustion engine such that an ignition timing of the internal combustion engine at the time when the first control is executed is controlled to a retarded side with respect to an ignition timing of the internal combustion engine at the time when the second control is executed, and control the variable valve actuating device such that, when the second control is executed, at least one of a valve lift of the intake valve and a valve operating angle of the intake valve increases as charging of the electrical storage device is more limited.

2. The hybrid vehicle according to claim 1, wherein the controller is configured to control the variable valve actuating device such that, when the second control is executed, at least one of the valve lift and the valve operating angle at the time when at least one of a first condition and a second condition is satisfied is larger than the corresponding at least one of the valve lift and the valve operating angle at the time when both the first condition and the second condition are not satisfied, the first condition is satisfied when a state of charge of the electrical storage device is higher than a first predetermined value, and the second condition is satisfied when an absolute value of a charge power upper limit value of the electrical storage device is smaller than a second predetermined value.

3. The hybrid vehicle according to claim 2, wherein
the variable valve actuating device is configured to selectively change the operation characteristic to any one of a first characteristic, a second characteristic and a third characteristic, at least one of the valve lift and the valve operating angle at the time when the operation characteristic is the second characteristic is larger than the corresponding at least one of the valve lift and the valve operating angle at the time when the operation characteristic is the first characteristic, at least one of the valve lift and the valve operating angle at the time when the operation characteristic is the third characteristic is larger than the corresponding at least one of the valve lift and the valve operating angle at the time when the operation characteristic is the second characteristic,
the controller is configured to control the variable valve actuating device such that, when the first control is executed, the operation characteristic is set to the first characteristic, and
the controller is configured to control the variable valve actuating device such that, when the second control is executed and when at least one of the first condition and the second condition is satisfied, the operation characteristic is set to one of the second characteristic and the third characteristic.

4. The hybrid vehicle according to claim 2, wherein
the variable valve actuating device is configured to selectively change the operation characteristic to one of a first characteristic and a second characteristic, at least one of the valve lift and the valve operating angle at the time when the operation characteristic is the second characteristic is larger than the corresponding at least one of the valve lift and the valve operating angle at the time when the operation characteristic is the first characteristic,
the controller is configured to control the variable valve actuating device such that, when the first control is executed, the operation characteristic is set to the first characteristic, and
the controller is configured to control the variable valve actuating device such that, when the second control is executed and when at least one of the first condition and the second condition is satisfied, the operation characteristic is set to the second characteristic.

5. The hybrid vehicle according to claim 1, wherein
the controller is configured to, when the second control is executed, determine a timing of an increase of at least one of the valve lift and the valve operating angle based on an output of the internal combustion engine and a remaining execution time of the second control such that a state of charge of the electrical storage device does not exceed a predetermined upper limit value.

6. The hybrid vehicle according to claim 1, wherein
the controller is configured to control the variable valve actuating device such that, when the second control is executed, at least one of the valve lift and the valve operating angle decreases as discharging of the electrical storage device is more limited.

7. The hybrid vehicle according to claim 6, wherein the controller is configured to control the variable valve actuating device such that, when the second control is executed, at least one of the valve lift and the valve operating angle at the time when at least one of a third condition and a fourth condition is satisfied is smaller than the corresponding at least one of the valve lift and the valve operating angle at the time when both the third condition and the fourth condition are not satisfied, the third condition is satisfied when a state of charge of the electrical storage device is lower than a third predetermined value, and the fourth condition is satisfied when an absolute value of a discharge power upper limit value of the electrical storage device is smaller than a fourth predetermined value.

8. The hybrid vehicle according to claim 7, wherein
the variable valve actuating device is configured to selectively change the operation characteristic to any one of a first characteristic, a second characteristic and a third characteristic, at least one of the valve lift and the valve operating angle at the time when the operation characteristic is the second characteristic is larger than the corresponding at least one of the valve lift and the valve operating angle at the time when the operation characteristic is the first characteristic, at least one of the valve lift and the valve operating angle at the time when the operation characteristic is the third characteristic is larger than the corresponding at least one of the valve lift and the valve operating angle at the time when the operation characteristic is the second characteristic, and
the controller is configured to control the variable valve actuating device such that, when the second control is executed, when at least one of the third condition and the fourth condition is satisfied and when the operation characteristic is the second characteristic or the third characteristic, the operation characteristic is changed to the first characteristic.

9. The hybrid vehicle according to claim 7, wherein
the variable valve actuating device is configured to selectively change the operation characteristic to one of a first characteristic and a second characteristic, at least one of the valve lift and the valve operating angle at the time when the operation characteristic is the second characteristic is larger than the corresponding at least one of the valve lift and the valve operating angle at the time when the operation characteristic is the first characteristic, and
the controller is configured to control the variable valve actuating device such that, when the second control is executed, when at least one of the third condition and the fourth condition is satisfied and when the operation characteristic is the second characteristic, the operation characteristic is changed to the first characteristic.

10. A control method for a hybrid vehicle, the hybrid vehicle including an internal combustion engine, an electrical storage device, an electric motor, an exhaust emission control device and a controller, the internal combustion engine including a variable valve actuating device, the variable valve actuating device being configured to change an operation characteristic of an intake valve, the electrical storage device being configured to store electric power, the electric power being generated by using the internal combustion engine, the electric motor being configured to generate a driving force of the hybrid vehicle by using the electric power, the exhaust emission control device being configured to purify exhaust gas from the internal combustion engine with the use of a catalyst, the control method comprising:

executing catalyst warm-up control by the controller, the catalyst warm-up control being control for warming up the catalyst, the catalyst warm-up control including first control and second control, the first control being control for operating the internal combustion engine at a first operating point, the second control being control for, after the first control is executed, operating the internal combustion engine at a second operating point irrespective of a driving force that is required to propel the hybrid vehicle, an output of the internal combustion engine at the second operating point being larger than an output of the internal combustion engine at the first operating point;

operating the internal combustion engine by the controller such that an ignition timing of the internal combustion engine at the time when the first control is executed is controlled to a retarded side with respect to an ignition timing of the internal combustion engine at the time when the second control is executed, and controlling the variable valve actuating device by the controller such that, when the second control is executed, at least one of a valve lift of the intake valve and a valve operating angle of the intake valve increases as charging of the electrical storage device is more limited.

\* \* \* \* \*